Feb. 7, 1956　　　W. J. DWYER　　　2,733,652
BALER

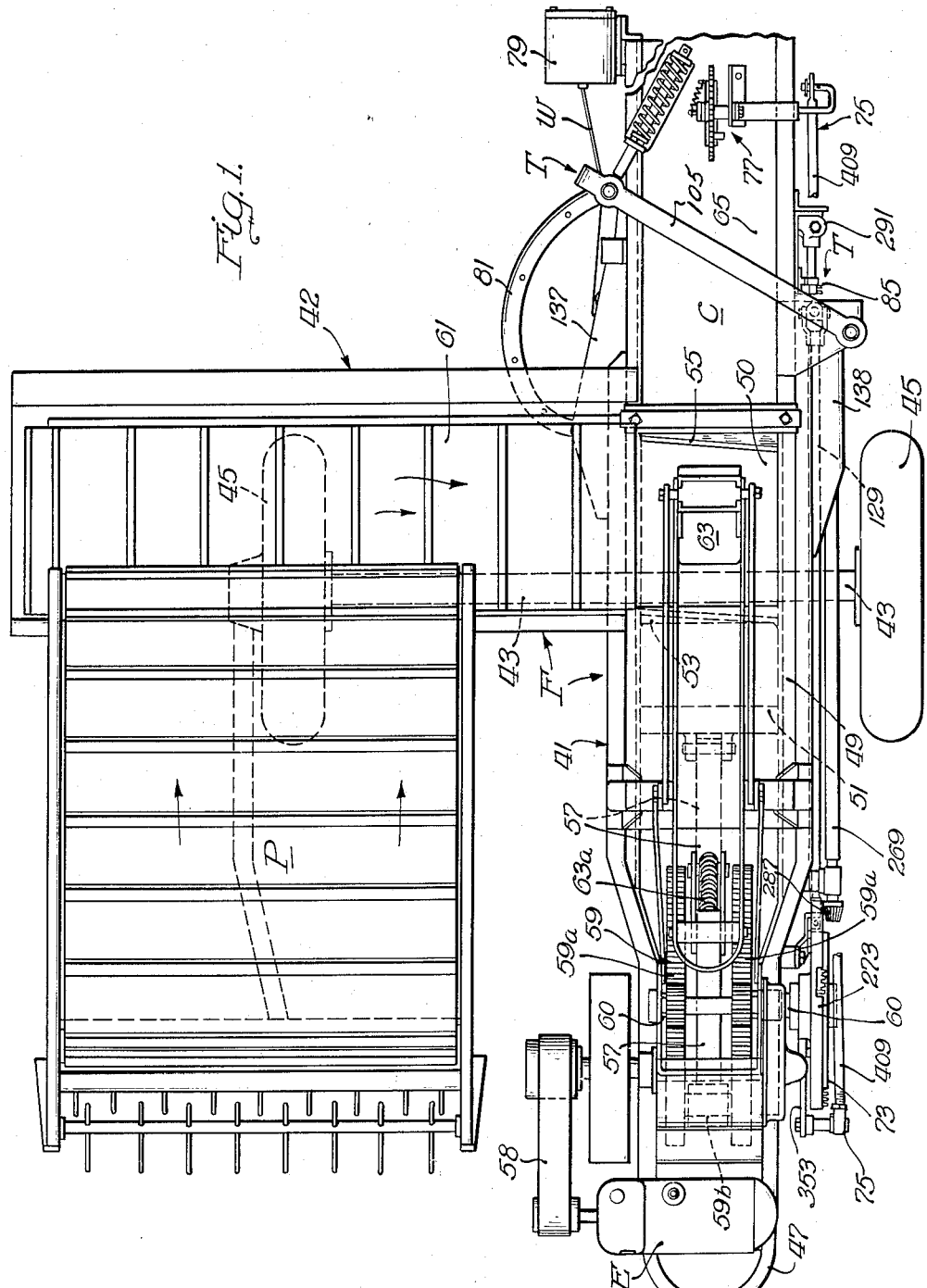

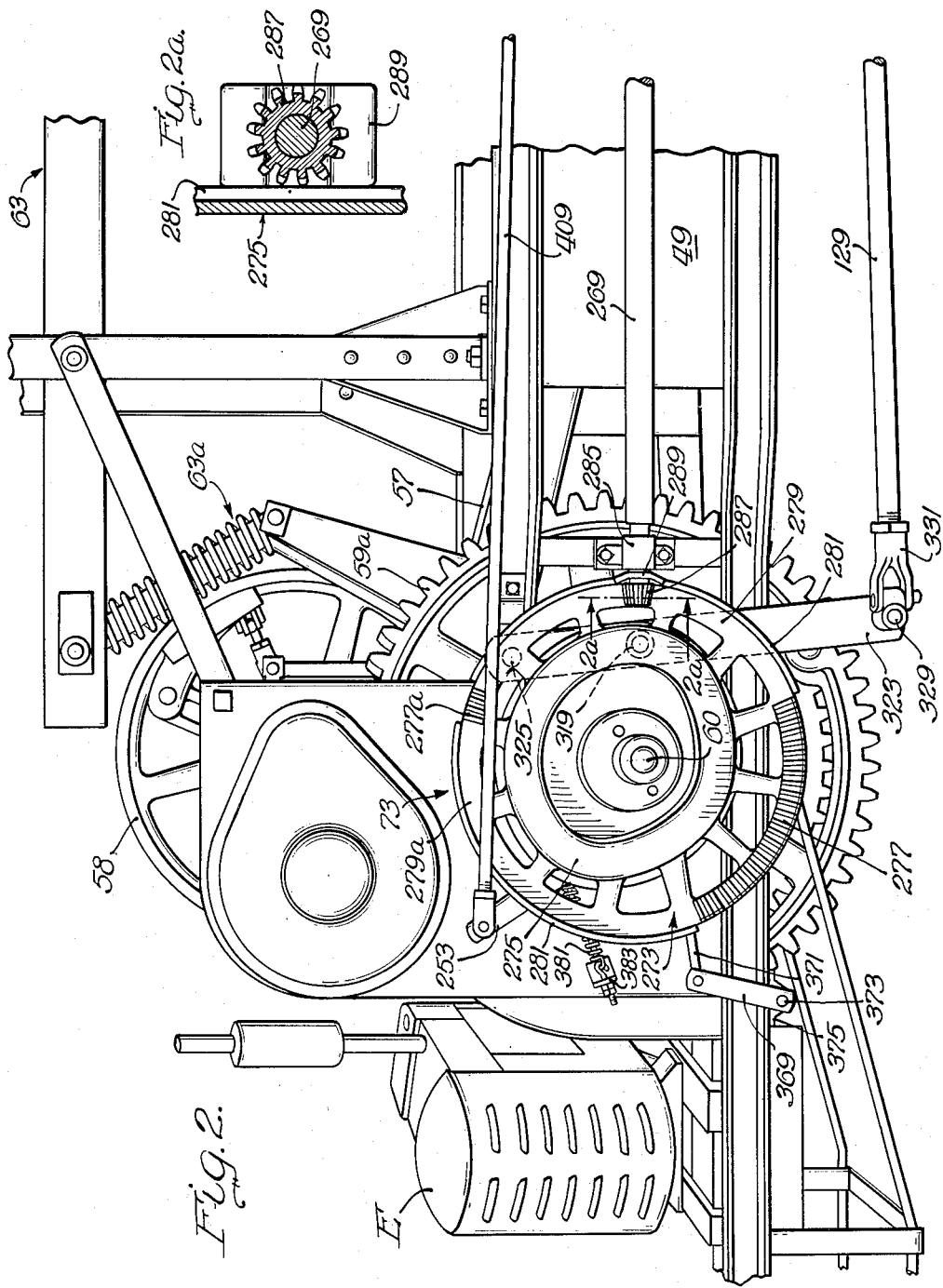

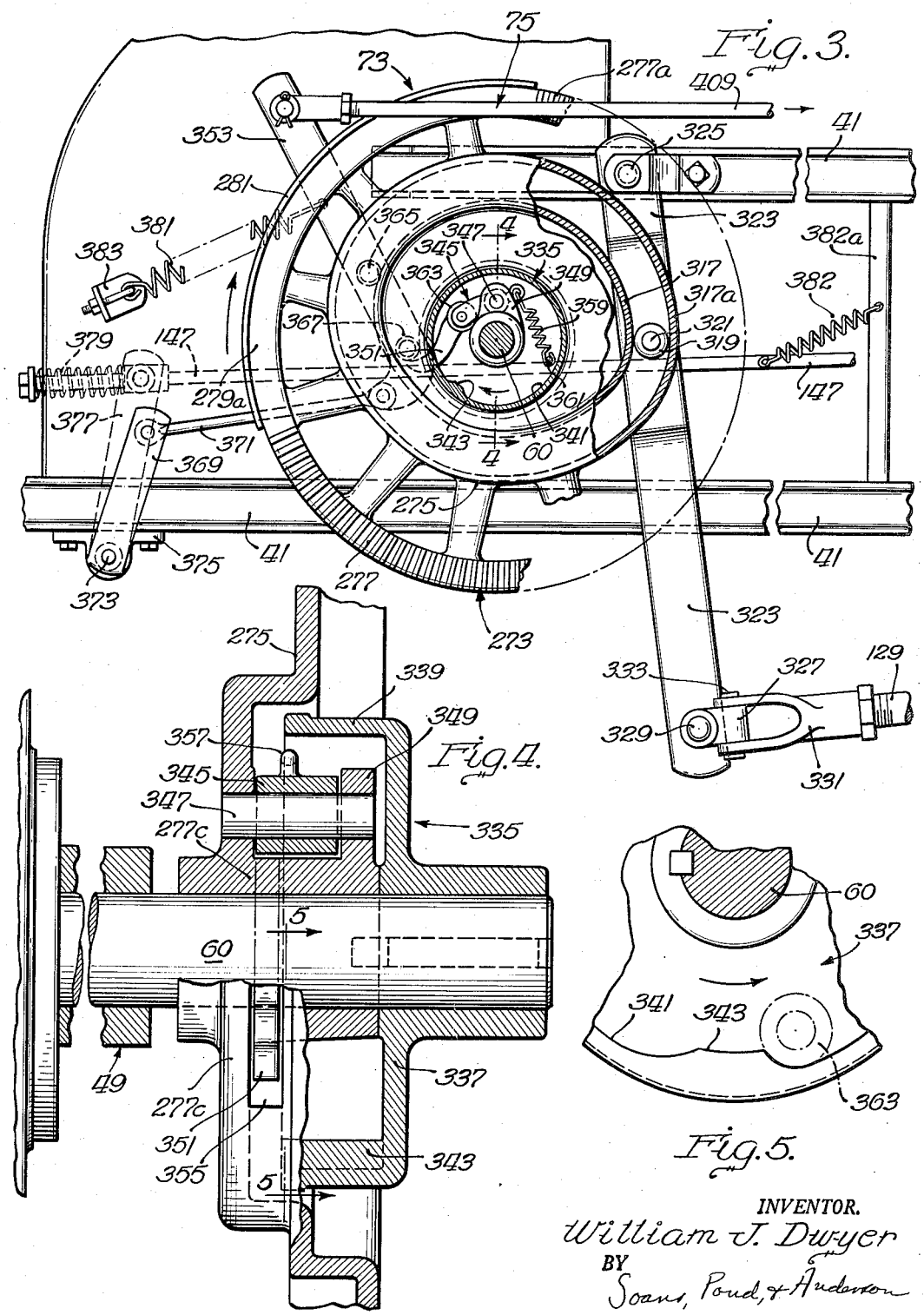

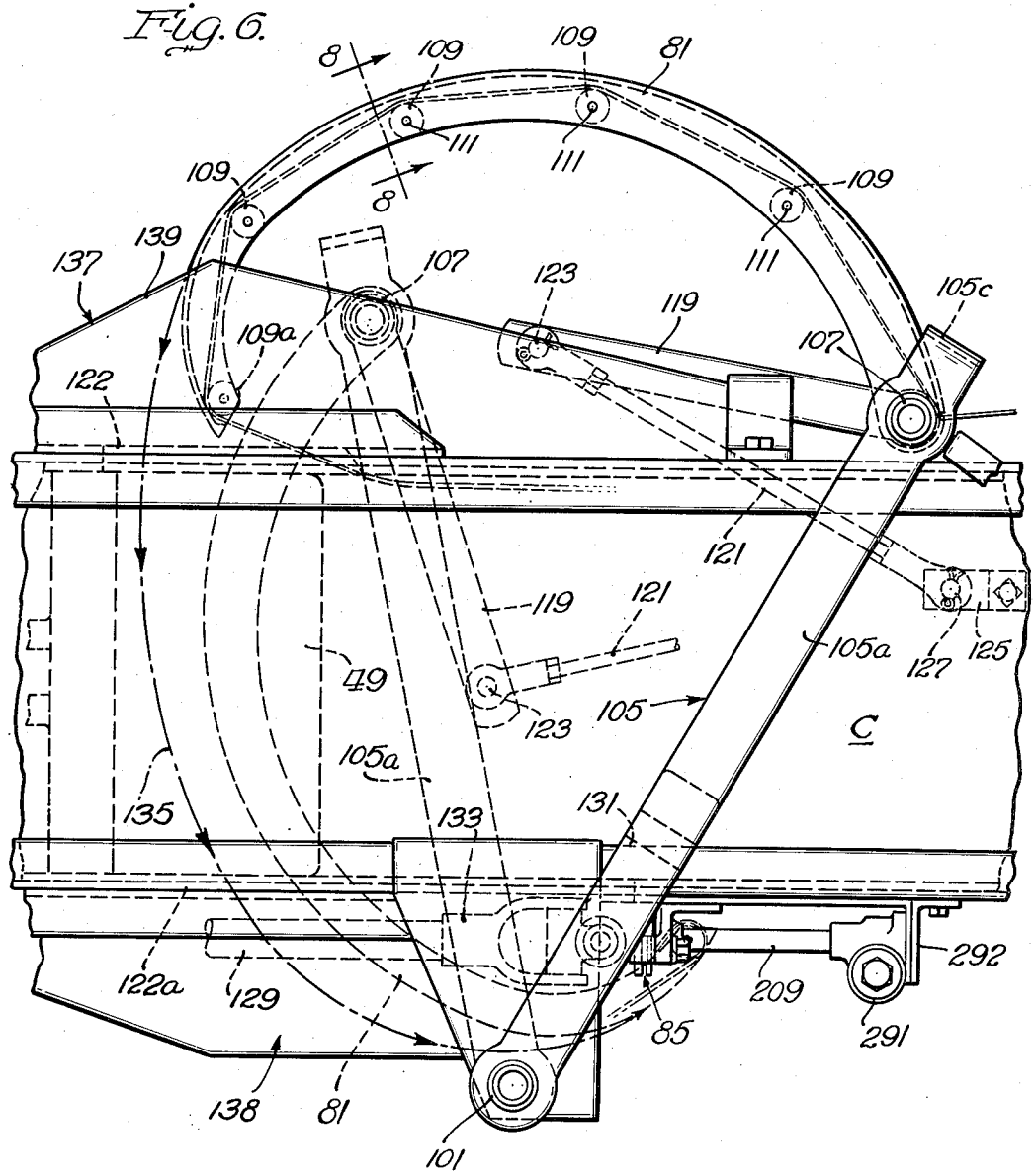

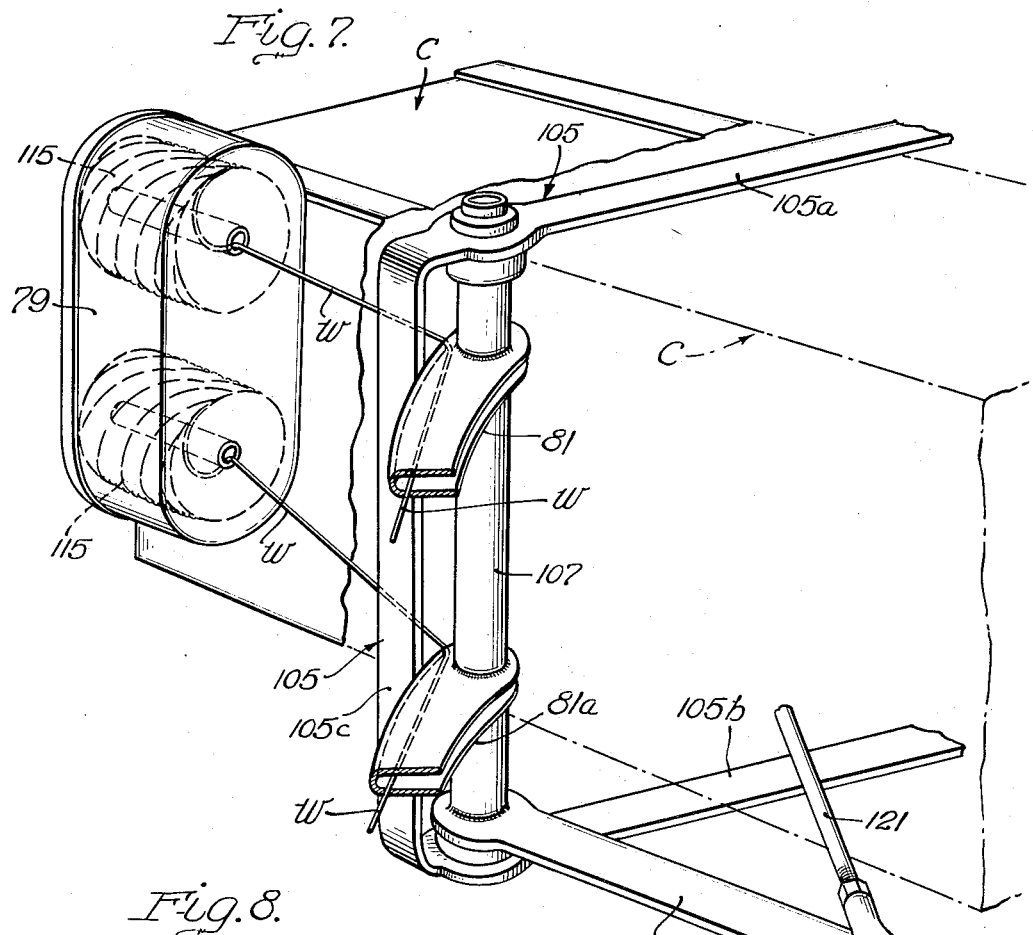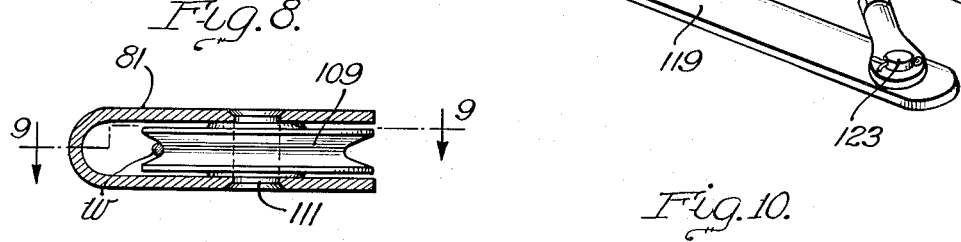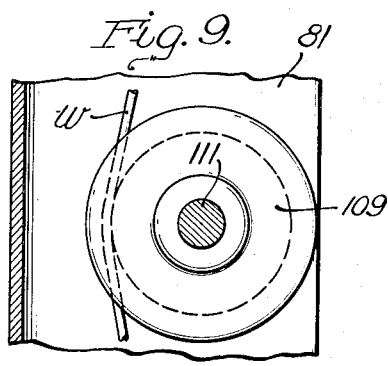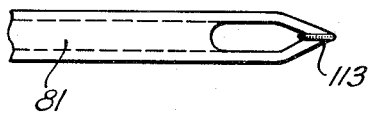

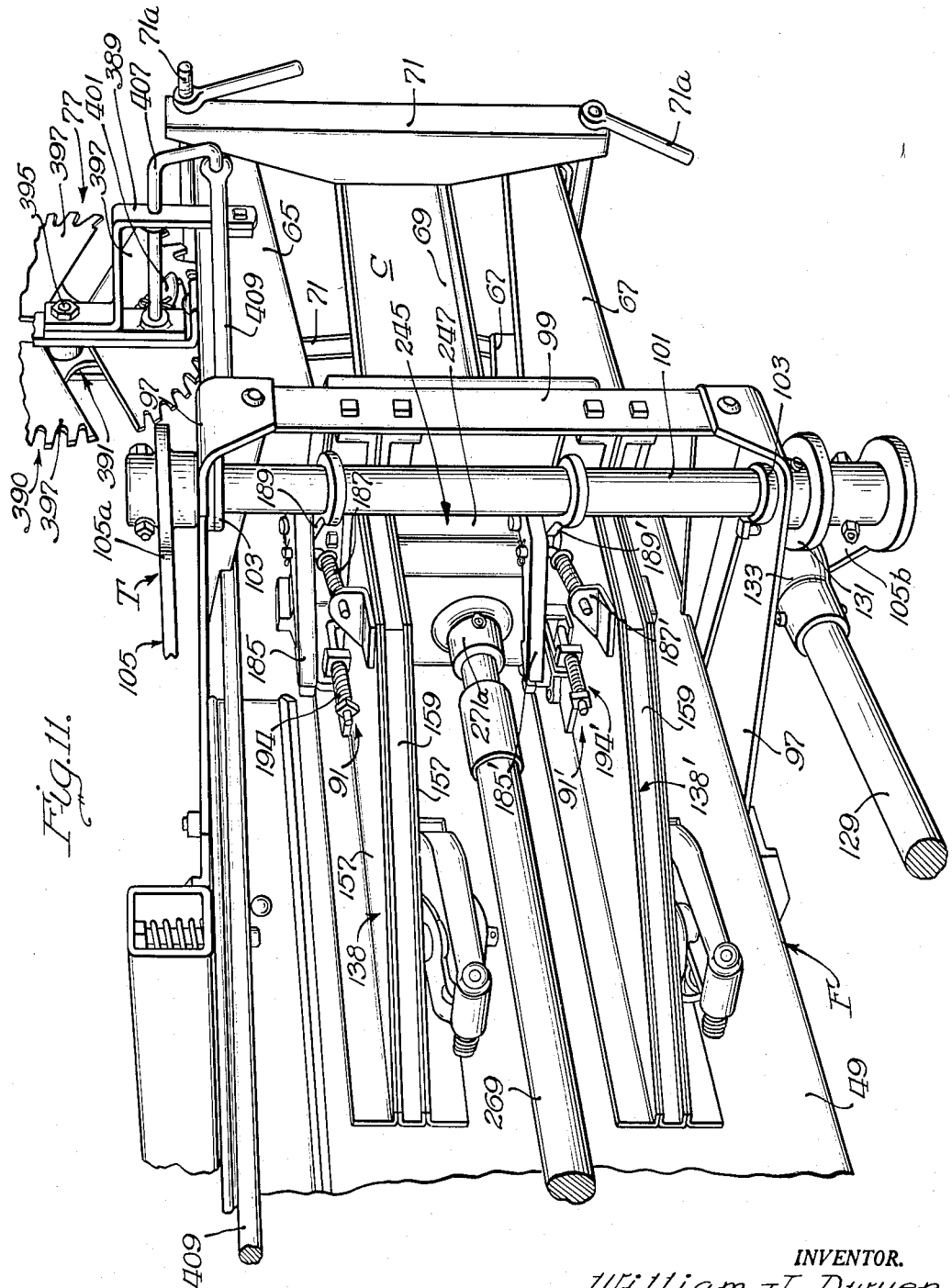

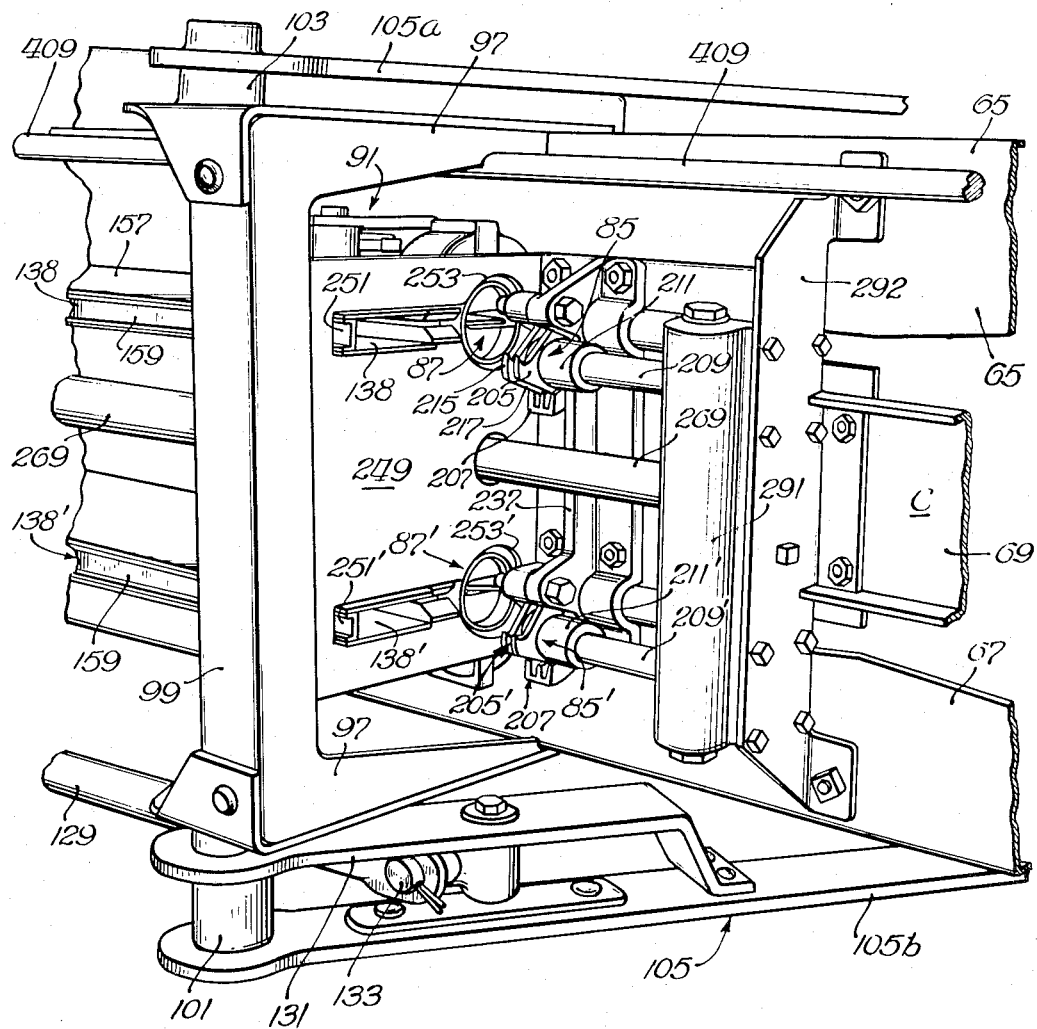

Filed Jan. 13, 1950　　　　　　　　19 Sheets-Sheet 8

INVENTOR.
William J. Dwyer
BY Soans, Pond & Anderson
Attys.

Feb. 7, 1956 W. J. DWYER 2,733,652
BALER
Filed Jan. 13, 1950 19 Sheets-Sheet 12

INVENTOR.
William J. Dwyer
BY Soans, Pond & Anderson
Attys.

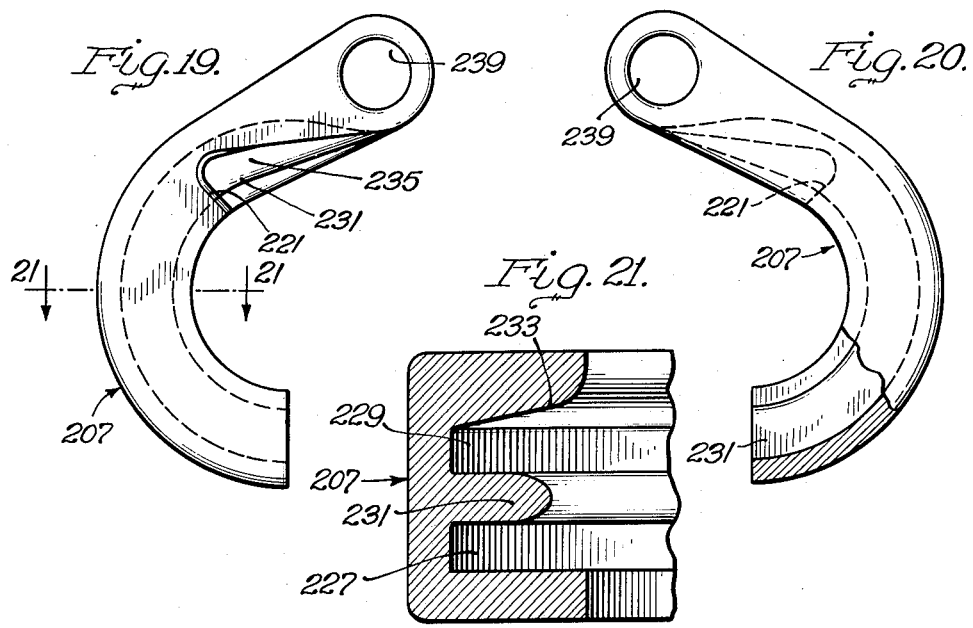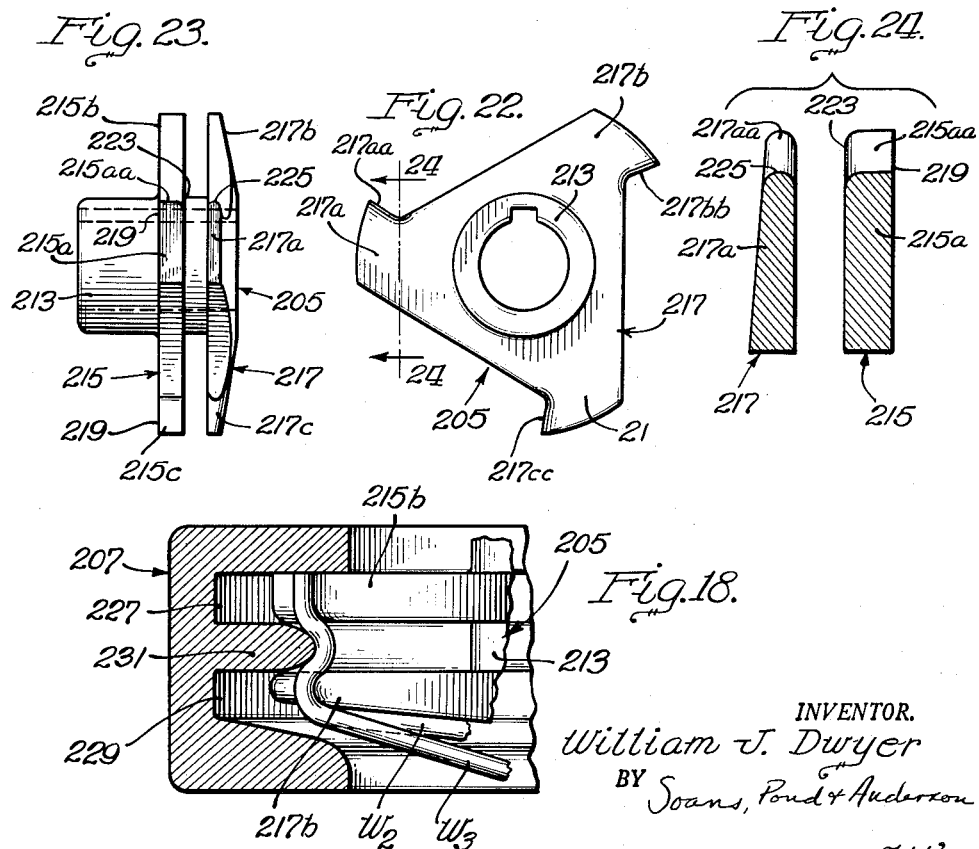

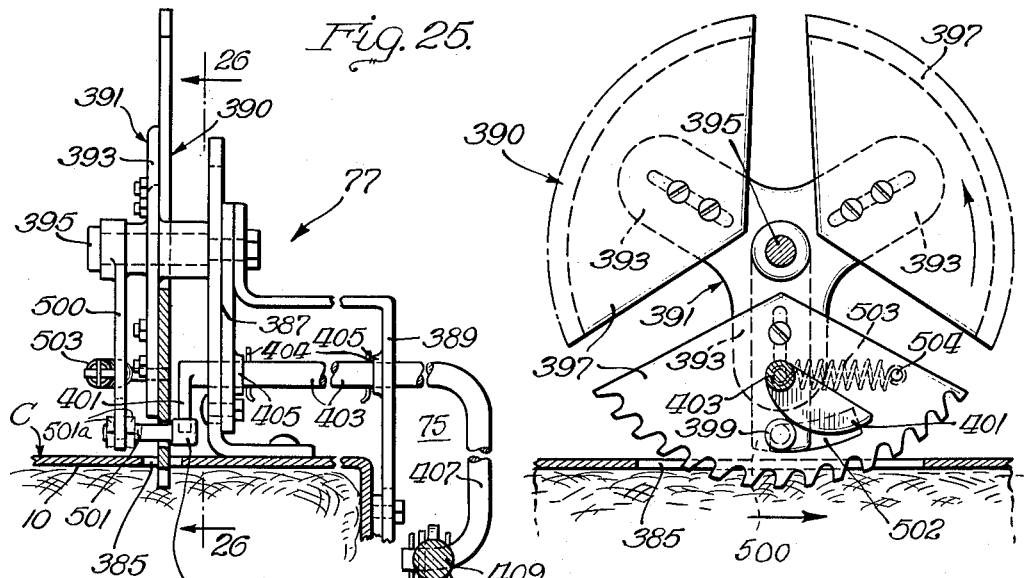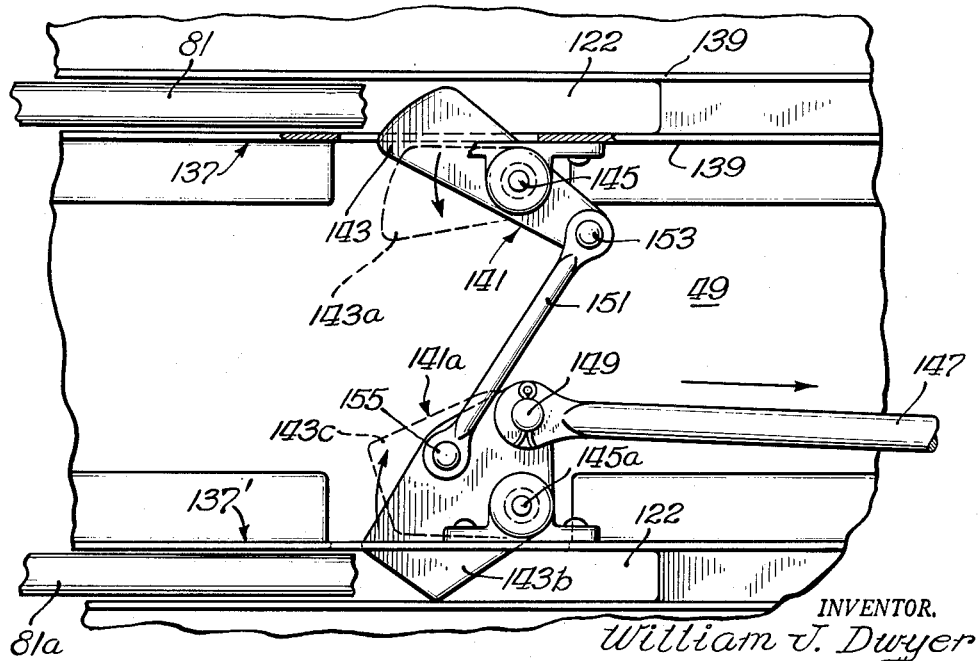

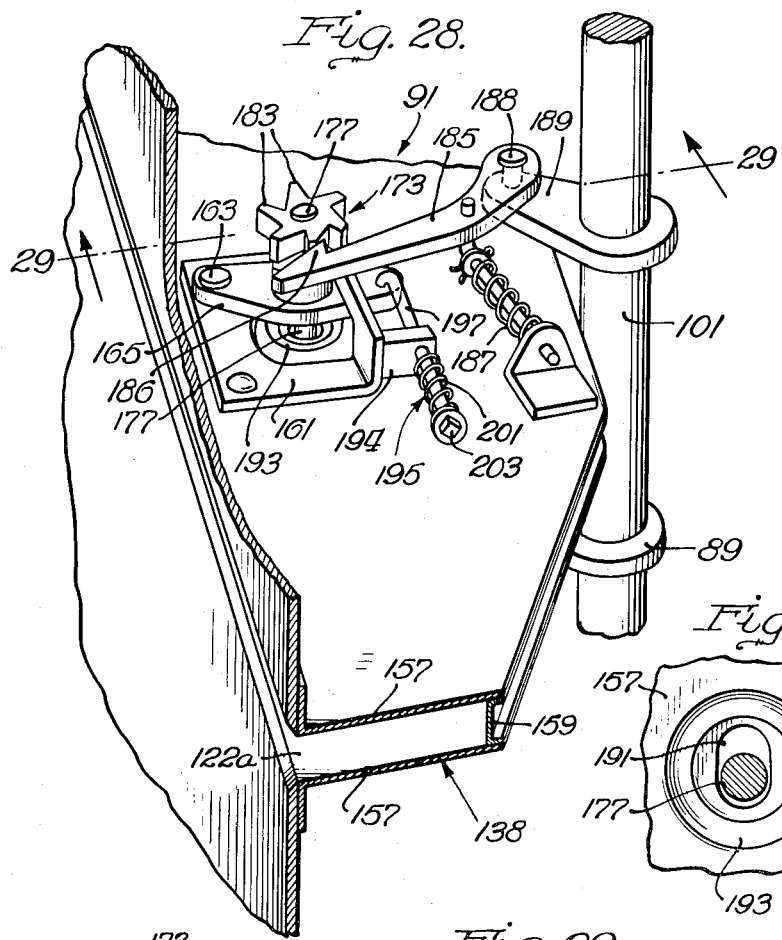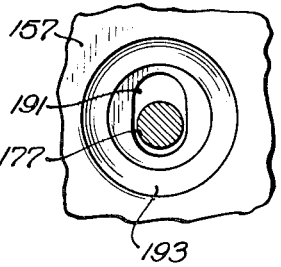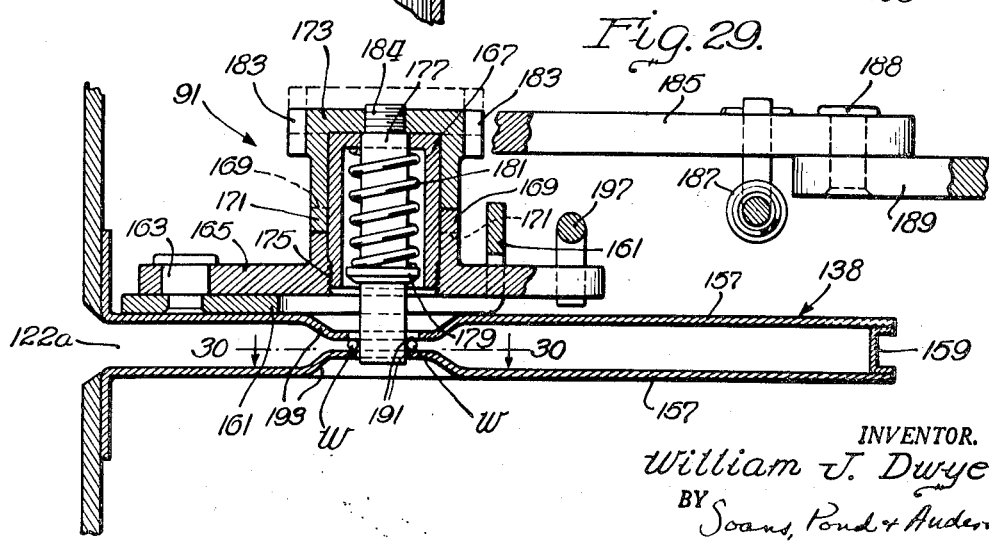

Feb. 7, 1956    W. J. DWYER    2,733,652
BALER
Filed Jan. 13, 1950    19 Sheets-Sheet 16
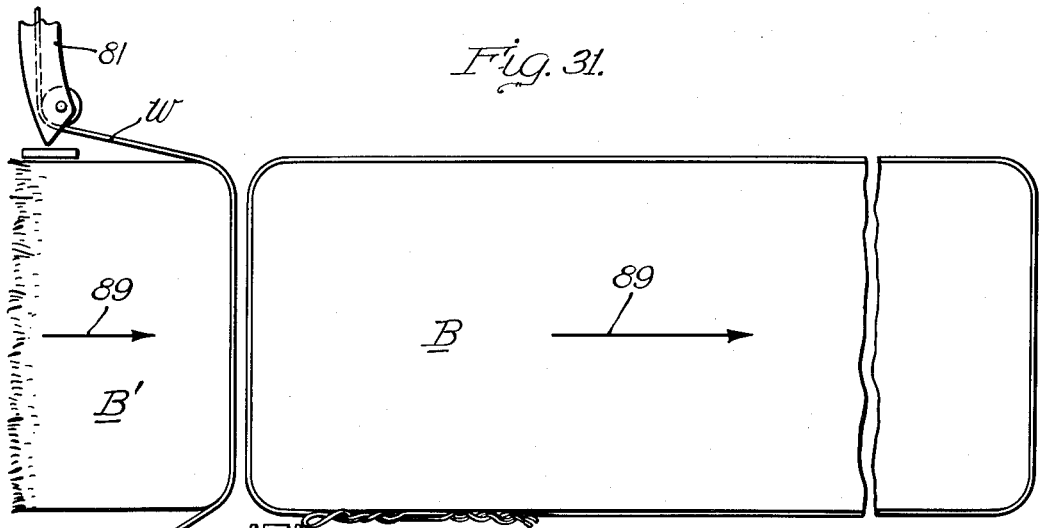
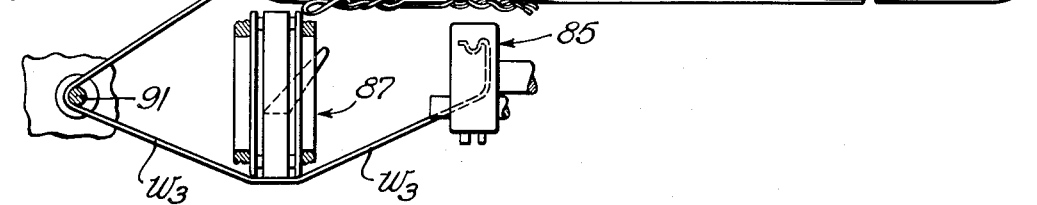
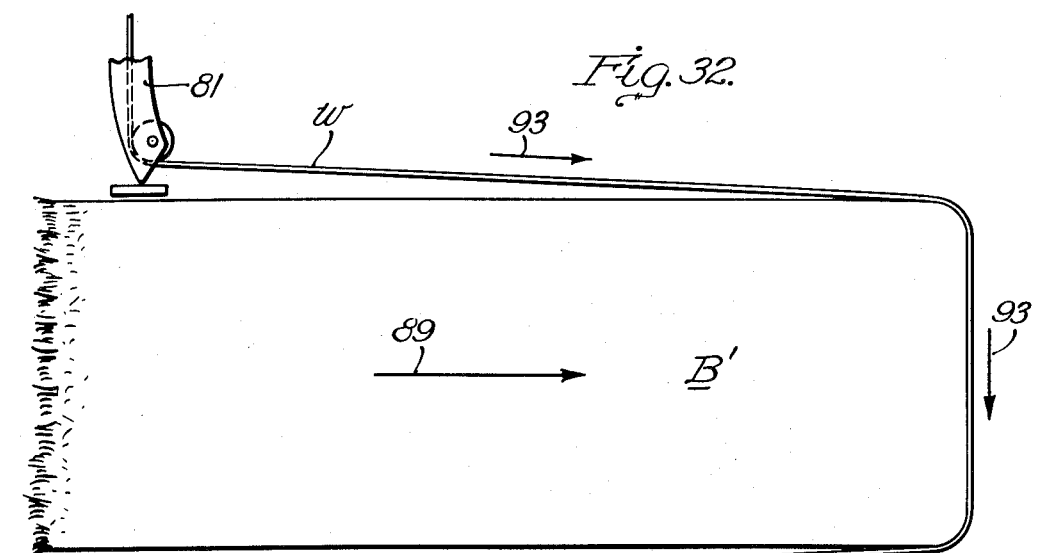
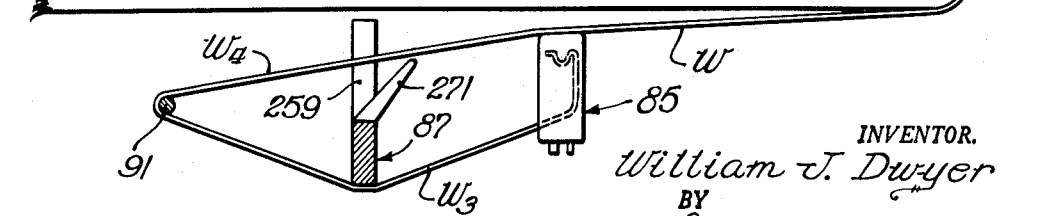
INVENTOR.
William J. Dwyer
BY Soans, Pond & Anderson
Attys.

Feb. 7, 1956  W. J. DWYER  2,733,652
BALER
Filed Jan. 13, 1950  19 Sheets-Sheet 17

INVENTOR.
William J. Dwyer
BY Soans, Pond & Anderson
Attys.

Feb. 7, 1956 W. J. DWYER 2,733,652
BALER
Filed Jan. 13, 1950 19 Sheets-Sheet 18

INVENTOR.
William J. Dwyer
BY Soans, Pond & Anderson
Att'ys.

Feb. 7, 1956  W. J. DWYER  2,733,652
BALER
Filed Jan. 13, 1950  19 Sheets-Sheet 19
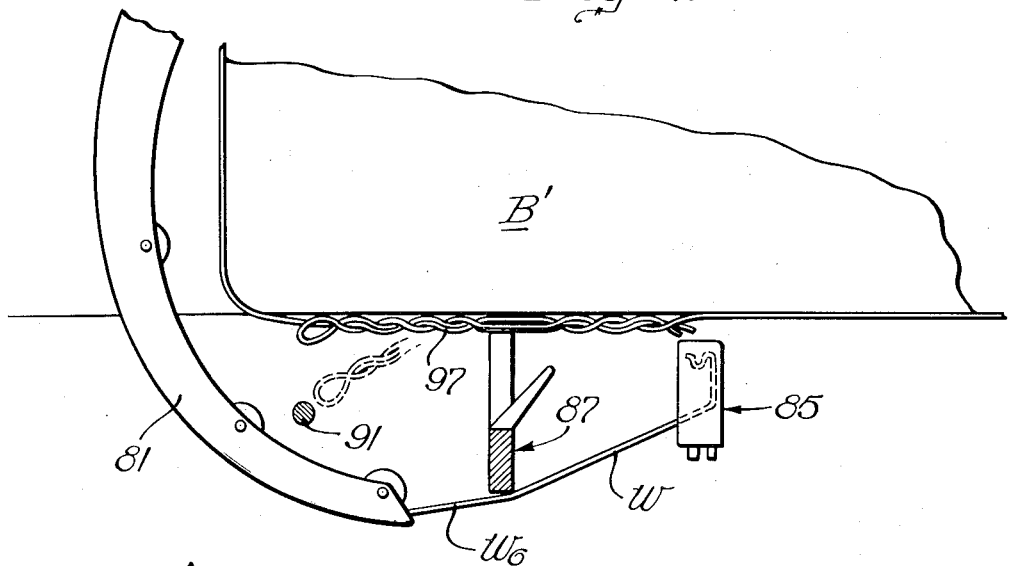
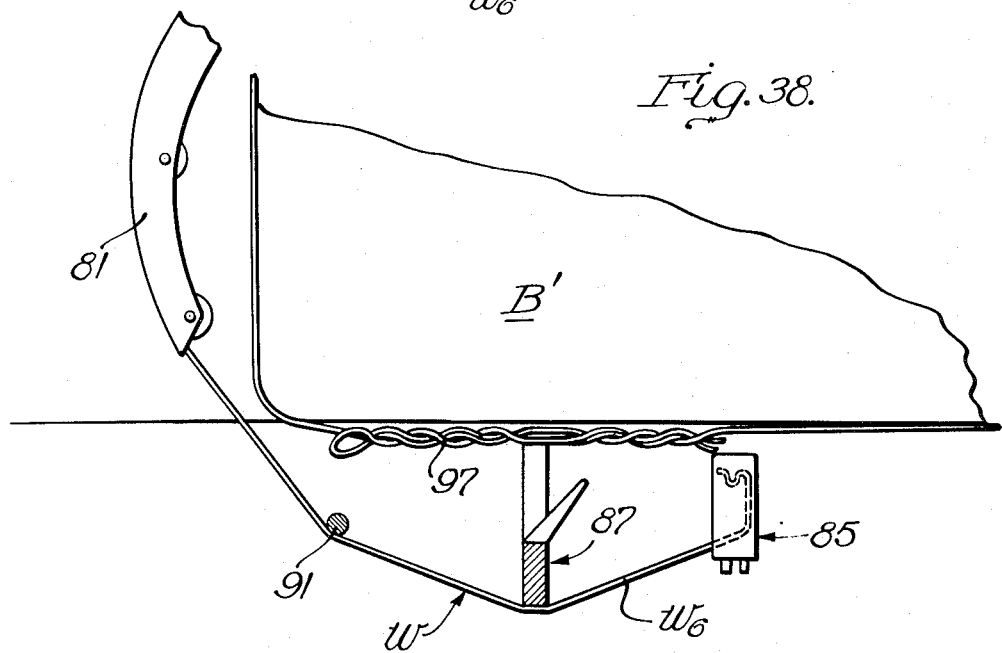
INVENTOR.
William J. Dwyer
BY Soans, Pond & Anderson
Attys.

United States Patent Office 2,733,652
Patented Feb. 7, 1956

2,733,652
BALER

William J. Dwyer, Battle Creek, Mich., assignor to J. I. Case Company, Racine, Wis., a corporation of Wisconsin Application January 13, 1950, Serial No. 138,507

31 Claims. (Cl. 100—4)

The present invention relates generally to balers and more particularly to an improved baler for agricultural use, which includes means for automatically tying the baled material with wire.

The baling of crop materials may be accomplished either in the field with a pick-up baler which is operable to gather a windrowed crop and to form it into bales or at a central location with a stationary baler, the material to be baled being hauled to the stationary baler for the baling operation. In conventional balers of either the stationary or the pick-up type, the material being baled is fed into an elongated chamber in which a reciprocable baling piston is disposed. The baling piston is driven from a suitable source of power, and during the operation of the baler, the piston compresses the hay or other material being baled and forces that material longitudinally of the chamber to a discharge opening. The baling chamber is, in effect, continued beyond the discharge opening by a skeletonized frame or bale case which is preferably constructed in such manner that the cross-sectional area thereof may be varied to change the amount of force required to move the compressed material therethrough, thereby providing means for controlling the density of the compressed material. The compressed material in the baling chamber and in the bale case is in the form of a continuous column or strip which is divided into units of the desired lengths to form bales before the compressed material passes out of the discharge end of the bale case. After the compressed material is divided into bales, but before the material is discharged from the bale case, one or more ties are placed around each bale to bind it together so that the shape of each bale will be retained as it passes out of the bale case. The bale ties may be applied by automatic mechanism or by hand.

Both wire and twine have been used for bale ties, although wire is more satisfactory because twine often breaks when subject to the mechanical strains incident to handling the bales, or becomes so weakened due to deterioration under storage conditions that the compressed material itself bursts the ties. Despite these disadvantages, twine is used in most commercially available automatic tying mechanisms chiefly because twine is highly flexible, and this simplifies greatly the construction of automatic bale tying mechanism. In fact, due to the complexity and high initial and maintenance cost of known apparatus for tying or twisting stiff wires, economic considerations have required that wire baling ties be tied or twisted manually. Manual tying with wire is, however, quite expensive, and as a result, there is a great need in the art for a relatively simple and reliable automatic mechanism for applying wire ties to bales of crop materials.

This problem of properly tying bales is particularly critical in the case of baling mechanisms which compress the crop material in separable layers. In baling mechanisms of this character, the baling piston or plunger is provided with a cutter knife or cutter knives which sever the material compressed on each stroke of the piston from the uncompressed material being fed into the baling chamber. Since this results in but a superficial interconnection between the layers of material compressed on successive strokes of the piston, the finished bale must be held under a substantial compressive force by the ties if the bale is to maintain its shape. Further, in a pick-up baler the bales are usually dropped onto the ground from a height of several feet incident to the operation of the baler, and as a consequence, unless the bales are securely tied, the resulting shock often breaks the bale ties.

Accordingly, the principal object of the invention is the provision of an improved baler which will overcome the deficiences of the prior art devices. A further object of the invention is the provision of an improved pick-up baler which forms the baled material into separable, compressed sections and which is operable to tie these sections with wire in a manner such that the bales will withstand the stresses incident to handling and storing the bale. More specific objects of the invention are the provision of improved means for feeding one or more continuous wires around a bale, the provision of improved means for interconnecting the wires to form bale ties, the provision of improved means for cutting the wires after the bale tie is formed, and the provision of means for driving and synchronizing the foregoing elements to effect smooth and rapid tying. Other objects and advantages of the invention will become known by reference to the following description and the accompanying drawings of one preferred embodiment thereof.

In the drawings:

Fig. 1 is a plan view of a baler embodying various features of the invention;

Fig. 2 is a fragmentary, perspective view showing the forward end of the baler illustrated in Fig. 1, particularly illustrating the arrangement of the timing and synchronizing mechanism which constitutes an important part of the illustrated apparatus;

Fig. 2a is a sectional view taken on line 2a—2a in Fig. 2;

Fig. 3 is a fragmentary, elevational view, partially in section, showing particular features of the mechanism illustrated in Fig. 2;

Fig. 4 is a sectional view taken on line 4—4 in Fig. 3;

Fig. 5 is a sectional view taken on line 5—5 in Fig. 4;

Fig. 6 is a fragmentary, plan view of the means employed for carrying a continuous wire around the bale;

Fig. 7 is a fragmentary, perspective view showing means for feeding the continuous wire to the mechanism illustrated in Fig. 6;

Fig. 8 is a sectional view taken on line 8—8 in Fig. 6;

Fig. 9 is a sectional view taken on line 9—9 in Fig. 8;

Fig. 10 is an end view of the needle which comprises a part of the mechanism illustrated in Fig. 6;

Fig. 11 is a perspective view of the bale case which constitutes a part of the baler illustrated in Fig. 1. This view particularly illustrates the means employed for supporting the tying mechanism on the bale case;

Fig. 12 is a perspective view showing improved mechanisms for tying the baling wires and for holding and cutting wires;

Fig. 18 is a fragmentary, sectional view taken on line 18—18 in Fig. 15;

Fig. 19 is an enlarged, elevational view of the forward side of a shroud or fixed cutter member which constitutes a part of the wire holding and cutting unit illustrated in Fig. 15;

Fig. 20 is an elevational view, partially in section, of the rearward side of the shroud shown in Fig. 19;

Fig. 21 is a fragmentary, sectional view taken on line 21—21 in Fig. 19;

Fig. 22 is an elevational view of the rotor or movable member which is a part of the wire holding and cutting unit shown in Fig. 15;

Fig. 23 is an end view of the member shown in Fig. 22;

Fig. 24 is a sectional view taken on line 24—24 in Fig. 22;

Fig. 25 is an elevational view, partly in section, showing the gauge means employed for determining the size of the bales formed in the baler illustrated in Fig. 1;

Fig. 26 is a sectional view taken on line 26—26 in Fig. 25;

Fig. 27 is a sectional view showing the safety gates for the needles. This mechanism is a part of the apparatus illustrated in Fig. 6;

Fig. 28 is a fragmentary, perspective view of a releasable retainer mechanism for holding the baling wire in position for tying;

Fig. 29 is a sectional view taken on line 29—29 in Fig. 28;

Fig. 30 is a sectional view taken on line 30—30 in Fig. 29; and

Figure 13:
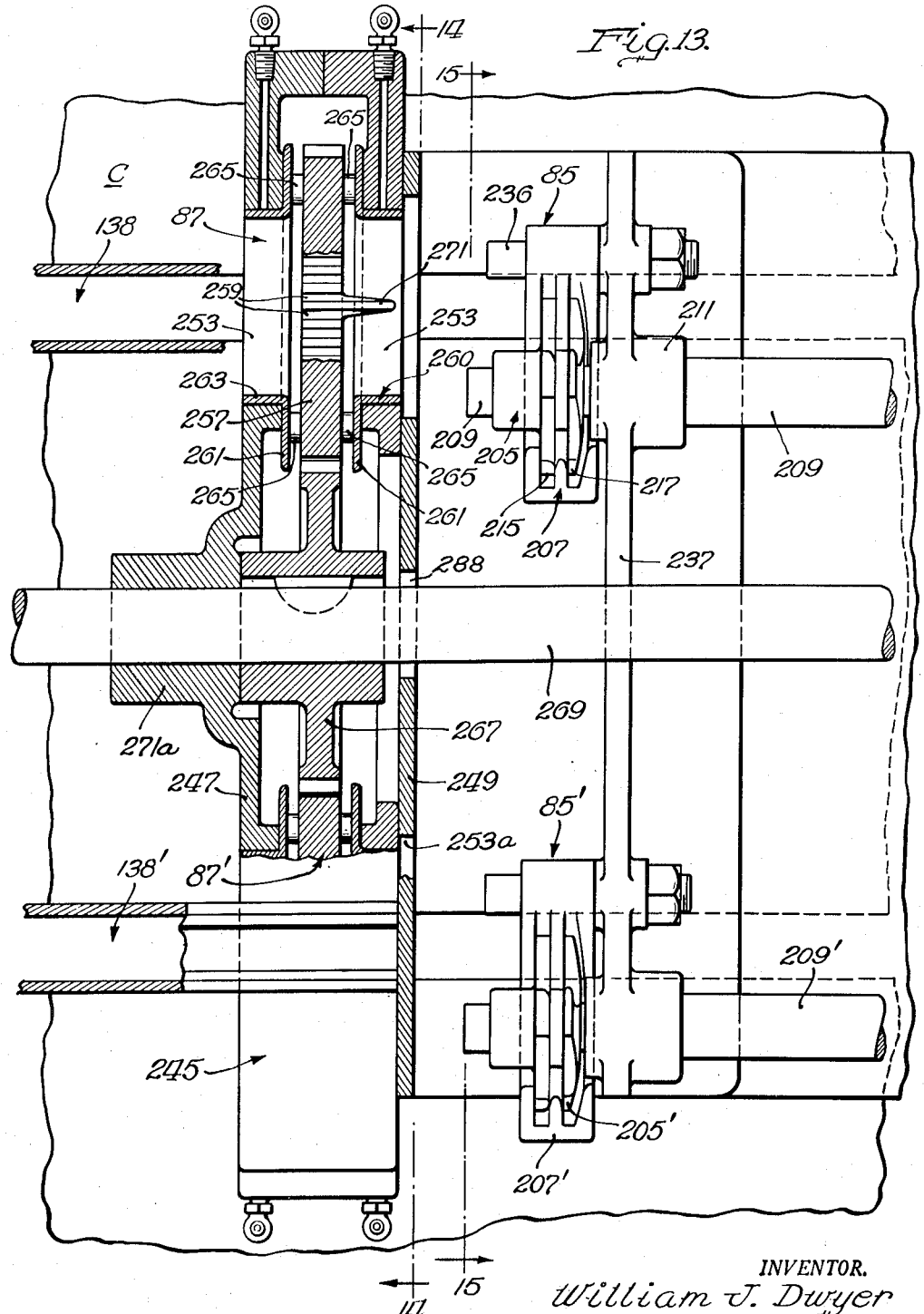
Fig. 13 is a fragmentary, elevational view of the mechanism illustrated in Fig. 12.

Figs. 31 to 38, inclusive, are diagrammatic views showing the step by step operation of the tying mechanism which constitutes a part of the illustrated baler.

For the purpose of clarity, the construction and operation of the illustrated baler and tying mechanism will be first described in general, and this general description will be followed by a detailed description of each of the subassemblies of the apparatus. The particular baler illustrated in the drawings is a large-sized, pick-up type baler; however, various features of the invention will be found applicable to small-sized balers and to stationary balers.

The illustrated baler includes a T-shaped main frame F (Fig. 1) which has one section, 41, disposed longitudinally of the line of draft of the implement and another section, 42, which is disposed transversely of the line of draft of the implement. In order that the baler may be drawn about a field, the frame F is provided with a transversely extending axle 43 to which is attached a pair of spaced-apart support wheels 45. The forwardmost end of the longitudinally extending frame section 41 includes a portion which constitutes a drawbar 47, the drawbar 47 being adapted to engage the draft bar (not shown) of an associated tractor or other draft vehicle (also not shown).

The central portion of the longitudinally extending frame section 41 is fabricated to provide an elongated, enclosed baling chamber 49. An inlet opening 50 for crop materials is provided in the upper portion of the baling chamber 49, and a baling piston 51 is reciprocatingly supported within the baling chamber 49 to compress the crop materials. In the illustrated baler, the upper edge of the baling piston 51 is provided with a knife blade 53 (Fig. 1), and this knife blade co-acts with a fixed blade 55 in the rearward edge of the inlet opening 50 (which is on the top of the baling chamber) to sever, on each stroke of the piston 51, any material which might connect compressed crop material to uncompressed crop material. The piston 51 is operably connected to an eccentric mechanism 59 by a connecting rod 57 to effect the reciprocation of the piston 51.

The eccentric mechanism 59 and the various other power operated elements on the baler may be driven from the tractor through a power take-off connection or the elements may be driven from a separate source of power. In the illustrated baler, the power for the baler mechanism is provided by an auxiliary engine E which is supported on the forward end of the frame section 41 rearwardly of the drawbar 47. The engine E is connected to the eccentric mechanism 59 by a belt and pulley power transmission 58 (Fig. 1). The eccentric mechanism 59 includes a pair of large, laterally spaced apart gear wheels 59a which are journalled on transversely extending stub shafts 60, the rearward end of the connecting rod 57 being pivotally attached to the periphery of these gears by a short shaft 59b. The gear wheels 59a and the shafts 59b and 60 thus constitute, in effect, a crankshaft for the connecting rod 57.

As illustrated in Fig. 1, the transversely extending frame section 42 supports a crop pick-up unit P which is adapted to pick up the crop from the field and to discharge the crop onto an elevated, belt type conveyor 61. The pick-up unit P is of a conventional type and may be similar to the pick-up unit described in the United States Letters Patent to McGregor, No. 2,048,940 issued July 28, 1936. The rearward or discharge end of the pick-up unit P is disposed adjacent the conveyor 61 which carries the picked up crop transversely of the line of draft of the implement and which discharges the crop material into the inlet opening 50 in the upper section of the baling chamber (Fig. 1). The movement of the crop material into the baling chamber is facilitated by the provision of a vertically reciprocating feeder head 63 which reciprocates in timed relation with the piston 51. The feeder head 63 is reciprocated by a linkage 63a which resiliently interconnects the feeder head 63 with the connecting rod 57.

Under the action of the baling piston 51 the crop materials are compressed and are moved rearwardly through the baling chamber section, 49, of the frame F into the rearward portion of the longitudinally extending frame section 41 which defines an adjustable bale case, indicated generally as C in Figs. 1, 11, and 12. As illustrated, the rearward end of the frame 41 is skeletonized and includes an upper guide member 65, a lower guide member 67, and a pair of side guide members 69. Each of the side guide members 69 is connected to the upper and lower guide members 65 and 67 by a member 71 which is provided with threaded means 71a (Fig. 11) for moving the side guide members 69 inwardly or outwardly relative to the upper and lower guide members to vary the effective cross-sectional area of the bale case C. Variations in the cross-sectional area of the bale case C change the forces required to move the compressed material therethrough and, as a result, effect a change in the density of the compressed material.

A tying mechanism, generally indicated as T, is supported on the portion of the frame 41 which refines the bale case C, this tying mechanism T being operable to automatically tie the compressed crop material in the bale case C into bales of predetermined size. The illustrated tying mechanism T is adapted to form one or more bale ties for each bale, each tie being made from a continuous length of wire. The tying mechanism T includes means for feeding the wire from one side of the bale case C to the other, intermittently operating means for holding or clamping the wire on the other side of the bale case C, means for forming and knotting the wire, and means for cutting the wire. The foregoing means are power operated and are driven by a timing and synchronizing mechanism 73 which is actuated through a linkage 75 by a gauge wheel mechanism 77.

Figure 33:
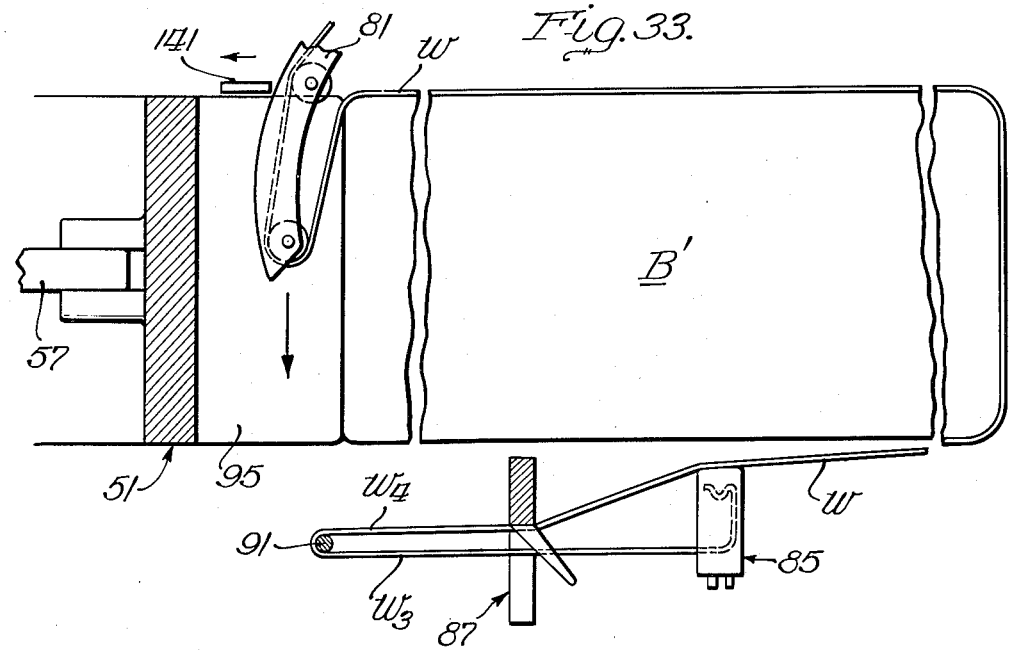
Figure 34:
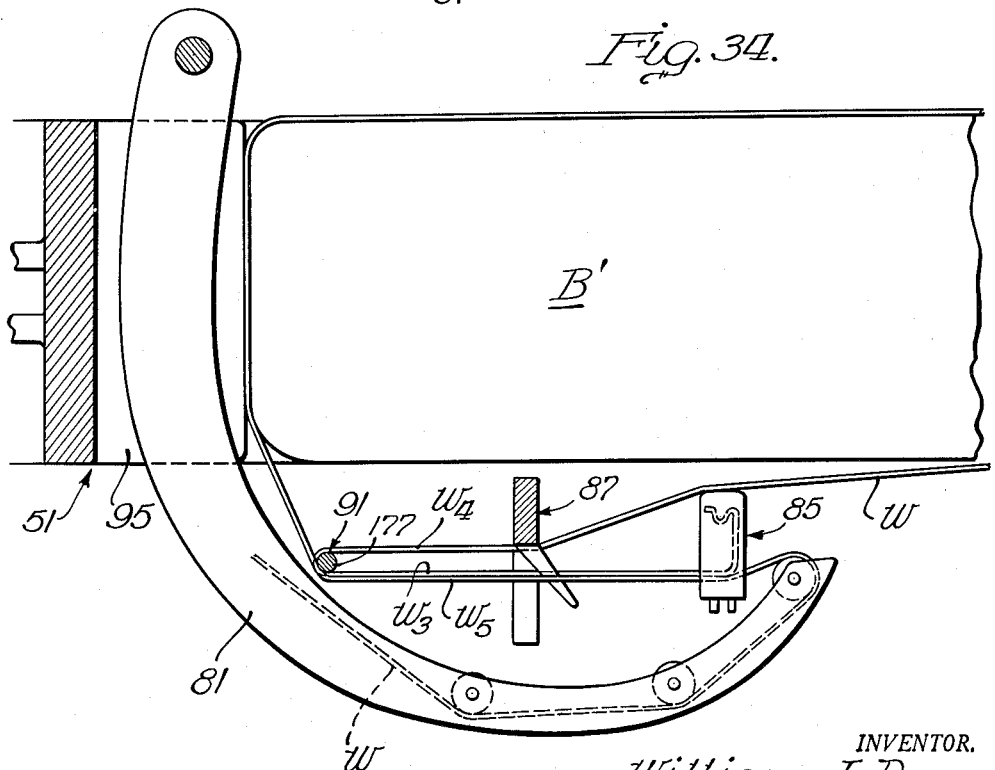
Figure 35:
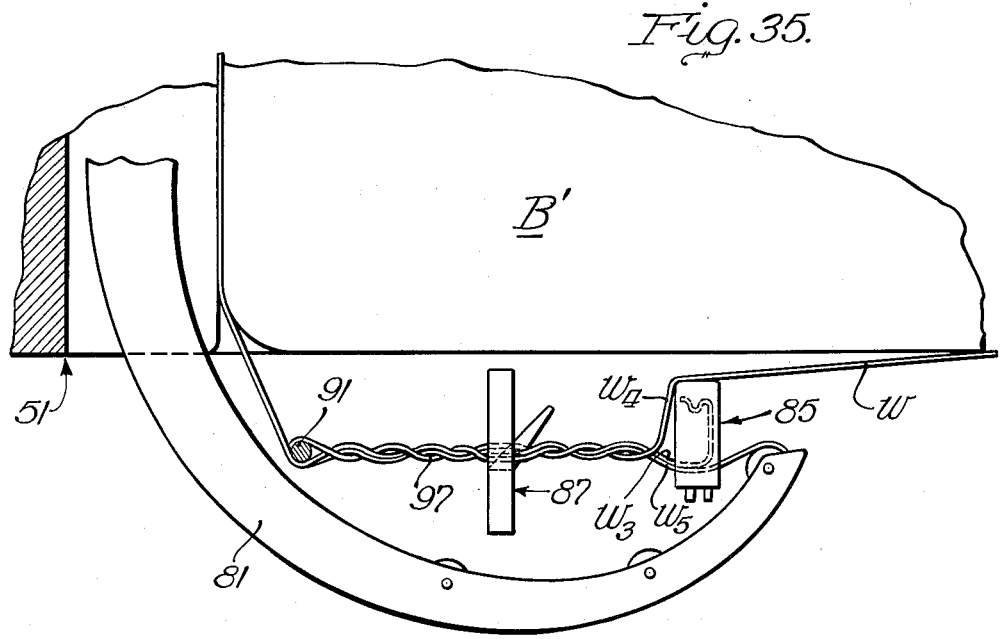
Figure 36:
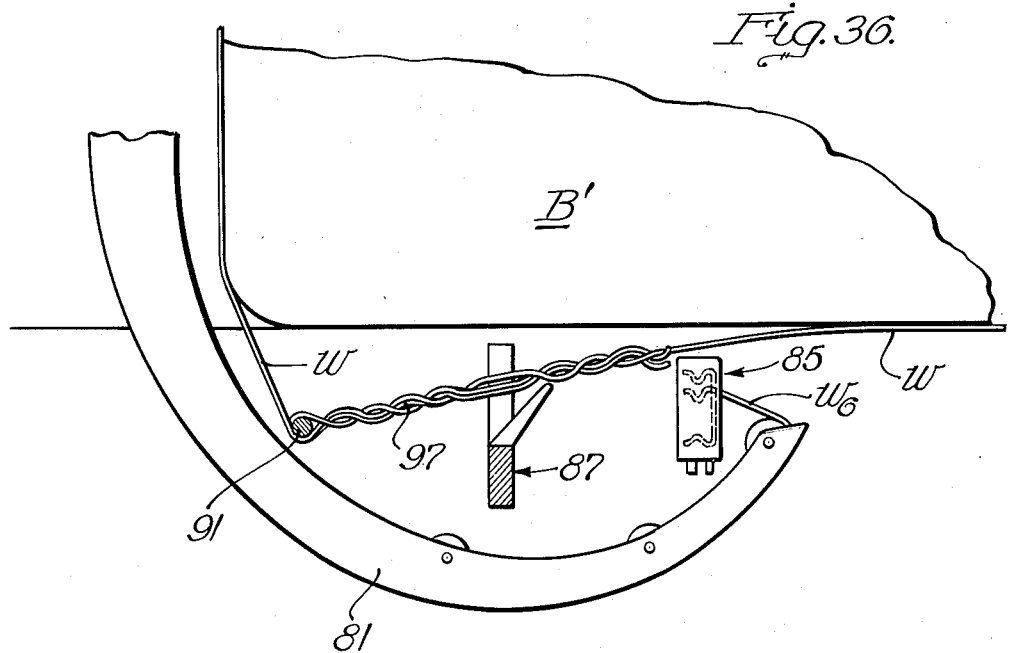

During the operation of the tying mechanism T, diagrammatically illustrated in Figs. 31 through 38, the wire, indicated as W, which is stored in a container 79 (Figs. 1 and 7) attached to one side of the bale case C, is threaded along a curved needle 81 which is swingably supported upon the side of the baler for movement into and across the baling chamber 49. Of course, there are two needles in the illustrated baler but, since the operation is identical for each bale tie, only one will be described. At the proper time in the baling cycle, the needle 81 is swung across the baling chamber 49 to place the strand of wire W into a combined wire holding and cutting unit 85 on the opposite side of the implement. The needle 81 is then retracted from the baling chamber, and subsequent movement of the compressed material through the bale case C draws the wire W around the bale until the wire W extends substantially around three sides of the bale (Fig. 32). The needle 81 is again moved across the baling chamber 49 carrying another portion of the strand of wire W to the holding and cutting unit 85 (Figs. 33 and 34). The wire W is then tied by a knotting or twisting unit 87, and the strand of wire W is cut by the unit 85 so that the tied bale will be free to move out the rearward end of the bale case C (Figs. 35 and 36). The needle 81 then is retracted (Fig. 31) and the cycle is repeated on the next bale.

More specifically, Fig. 31 illsutrates the tying mechanism T at the instant immediately following the bale tying operation on the bale B, the compressed material moving in the direction of the arrows 89 in Figs. 31 and 32. As may be seen in Fig. 31, one end of the wire W is clamped in the holding mechanism 85, and the strand of wire extends across the knotting unit 87, around a wire retaining means or wire positioning mechanism 91, across the bale case C to the needle 81. Fig. 32 illustrates the disposition of the wire after a sufficient amount of material has moved along the bale case to provide a bale length of material. During the time that the compressed material is moving along the bale case C, the wire W is drawn through the needle 81, as indicated by the arrows 93 in Fig. 32. When it has been determined that the proper length of compressed material is in the bale case to form the next bale B', the needle 81 is moved into and across the bale case through a slot or passageway 95 provided in the forward face of the baling piston 51 (Fig. 33). The needle 81 continues to move and lays the wire around the wire retaining means 91 and into the knotting unit 87 and the wire holding and cutting unit 85, as illustrated in Fig. 34. The twisting unit 87 then spins the strands of wire disposed therein to provide a twisted knot 97 (Fig. 35) and the unit 85 then operates to cut the strand of wire W thereby severing the bale tie from the remainder of the wire (Fig. 36). The needle 81 then retracts (Figs. 37 and 38) to provide a length of wire for forming the next bale tie.

As may be seen from the foregoing brief general description, it is extremely important that the movement of the various elements be accurately timed since the needle must pass into and across the baling chamber while the piston is in its rearwardmost position, that is at the end of a compression stroke. Further, the tying and cutting must occur rapidly since the next stroke of the piston will move the baled material rearwardly and remove it from its position relative to the tying and holding units 87 and 85.

Wire feeding mechanism

The means for feeding wire from one side of the bale case C to the other in the illustrated baler includes a pair of the arcuate, vertically spaced-apart needles 81 and 81a which are supported as shown in Figs. 1, 6, 7, 11 and 12, upon a swingable frame 105 actuated by the timing and synchronizing mechanism 73. The frame 105 is moved at the proper time in the baling cycle to swing the needles 81 and 81a across the baling chamber 49 thereby carrying each of the two continuous wires W to the wire holding and cutting units 85 and to the knotting or twisting units 87.

As previously pointed out and as particularly illustrated in Figs. 1, 6, 33, and 34, the forward face of the baling piston 51 is provided with a pair of slots or passageways 95 which permit free movement of the needles 81 and 81a across the bale case C. The passageways 95 are horizontally extending and are vertically spaced-apart to receive the two needles 81 and 81a. Figs. 33 and 34 show the needle 81 passing across the bale case through the passageways 95, the piston 51 being in the rearwardmost or the compressing position. The provision of the passageways 95 permits a reduction in the overall weight of the needle and swinging frame unit since the provision of the guide passageways 95 makes it unnecessary to force the needles 81 and 81a through compressed crop material.

The swingable frame 105 is supported upon a pair of vertically spaced-apart brackets 97 (Fig. 11) which are disposed in the illustrated mechanism on the left-hand side of the baling chamber, and these brackets are interconnected by a vertically extending reinforcing member 99. The swingable frame 105 is generally U-shaped and includes a vertically extending shaft 101 which is journalled in bearings 103 attached to the brackets 97, the frame 105 being adapted to swing freely about the axis provided by the vertically extending shaft 101. The frame 105 also includes an upper lever section 105a (Figs. 6, 7, and 11), a lower lever section 105b, and a vertically extending connecting section 105c, the vertically extending section 105c being disposed on the right-hand side of the baling chamber (Fig. 6). The upper and lower sections, 105a and 105b which are rigidly attached to the shaft 101, are interconnected by a vertically extending shaft 107 (Figs. 6 and 7) which is adapted to carry the needles 81 and 81a. The shaft 107 is rotatably journalled between the sections 105a and 105b so that the needles 81 and 81a and the shaft 107 are rotatable as a unit relative to the U-shaped frame 105.

As has been pointed out, the needles 81 and 81a are vertically spaced-apart and are disposed in a horizontal plane. Each of the needles 81 and 81a comprise an arcuate shaped length of sheet metal which is folded to provide a U-shaped cross section (Figs. 7 and 8). The U-shaped cross section of the needles 81 and 81a and the hardening which results from drawing or folding the metal into the desired arcuate shape enhances the strength of the sheet material so that the needles 81 and 81a will be self-supporting along their entire length. A plurality of spaced-apart guide pulleys 109 (Figs. 6, 8, and 9) are disposed along the length of each of the needles 81 and 81a, and each of the pulleys 109 is rotatably supported upon a vertically extending pin 111 fixedly attached to the upper and lower surfaces of the needles. The pulleys 109 are adapted to guide the strand of wire W along the needle and to retain the strand of wire W within the protective covering provided by the U-shaped cross section of the needle. The tip or outer end of each of the needles 81 and 81a is formed as shown in Fig. 10 to provide a point 113 which will penetrate loose crop materials which may become lodged in the passageways 95 incident to the operation of the implement. A guide pulley 109a (Fig. 6) is disposed adjacent the tip or point of each of the needles 81 and 81a to insure that the strand of wire W is played out of the associated needle in the desired path.

The wire W for the needles 81 and 81a is drawn from spools or rolls 115 which are disposed in the container 79 (Figs. 1 and 7) which is located rearwardly of the swingable frame 105 on the right-hand side of the bale case C. The spools of wire 115 (Fig. 7) are formed in accordance with the usual practice so that the wire may be drawn from the spool without causing kinks in the strand. One spool of wire is provided for each of the needles 81 and 81a since each of these needles is associated with a separate holding and cutting unit 85 and a separate twisting unit 87. It should be noted, however, that the operation of each of the needles 81 and 81a and their auxiliary tying and cutting mechanisms are controlled by the same synchronizing means 73 as will be subsequently described.

A horizontally extending arm 119 (Figs. 6 and 7) is rigidly attached to the lower end of the vertically extending shaft 107 which supports the needles 81 and 81a. The other end of the arm 119 is pivotally connected to one end of a tie rod 121 by a vertically extending pivot 123, the other end of the tie rod 121 being pivotally connected to a bracket 125 on the lower side of the bale case (Fig. 6) by a second vertically extending pivot 127. The swingable frame 105 is attached to an actuating means by a longitudinally extending pitman 129 (Figs. 6 and 11). The pitman 129 is pivotally attached to the lower section 105b of the frame 105 and an auxiliary arm 131 by a universal joint 133.

As will be seen from Fig. 6, longitudinal movement of the pitman 129 effects fore and aft swinging movement of the frame 105 about the axis defined by the shaft 101 and this swinging movement of the frame 105 causes the tie rod 121 and the arm 119 to effect the movement of the needles 81 and 81a in a manner such that they pass through a pair of openings 122 in the right-hand side of the baling chamber 49, across the baling chamber at substantially right angles to the line of movement of the piston 51, and through a pair of openings 122a in the left-hand side of the baling chamber. The action of the arm 119 and the tie rod 121 and the relative proportions of the frame 105 cause the needles to initially move rapidly across the baling chamber and finally, at the innermost portion of the needle path, to move around the twisting and holding units 87 and 85, respectively, thereby laying the strand of wire in those units (Figs. 6 and 34). The return of the needles 81 and 81a to the normal or retracted position is effected by a rearward movement of the pitman 129, the arm 119 and the swingable frame 105 causing the needles 81 and 81a to retrace the inwardly swinging path which is shown by the broken line 135 (Fig. 6).

In order to guide the needles 81 and 81a in their swinging path, a pair of guideways 137 and 137' are disposed on the right-hand side of the baler and a pair of guideways 138 and 138' are located on the left-hand side of the baler (Fig. 6). The right-hand pair of guideways 137 and 137' are vertically spaced apart to register with the needles 81 and 81a, respectively, and each includes an upper and a lower horizontally disposed, longitudinally extending, generally triangular-shaped metal plate, as illustrated at 139 (Figs. 6 and 27) which are vertically spaced apart to receive the needle with which the guideway coacts. The guideways 137 and 137' prevent materials from lodging between the needles and the wall of the bale case and insure that none of these materials will interfere with the playing out of the wire W around the bale. Further, these guideways provide a support for the ends of the needles when they are in the retracted position (the full-line outline in Fig. 6).

In order that the needles 81 and 81a may not accidentally swing into the baling chamber under the very considerable pull of the wire drawn out of them by the rearward movement of the bale, the needle admitting openings 122 in the right-hand side of the baling chamber are provided with a pair of gates 141 and 141a which are moved to open automatically when the proper point in the baling cycle is reached. The gates 141 and 141a are particularly illustrated in Fig. 27, the gate 141 being associated with the guideway 137 and the gate 141a being associated with the guideway 137'. The gate 141 includes a lobe-like member 143 which is pivotally supported on a pin 145 attached to the side of the baling chamber 49 so that the member 143 may be swung into a position which will block the inward movement of the upper of the needles 81.

The lower gate, 141a, also includes a lobe-like member 143b which is pivotally supported at its forward end on a horizontally disposed, transversely extending pivot 145a which is attached to the side of the baling chamber 49. The lobe member 143b is connected to the timing and synchronizing means 73 by a longitudinally extending pitman 147, the rearward end of the pitman 147 being attached to the lobe 143b by a horizontally disposed, transversely extending pivot pin 149. The upper lobe member 143 is connected to the lower lobe member 143a by a pivoted link connection which includes a compression resisting link 151 which extends between a pivot 153 on the lobe 143 and a pivot 155 on the lobe 143b. Forward movement of the pitman 147 thereby moves the lobe members 143 and 143b from their position blocking the openings 122 into the position shown by the dotted outline in Fig. 27. As the openings 122 are uncovered, the timing and synchronizing means 73 effects the movement of the needles 81 and 81a into openings 122 to carry the strand of wire W across the bale case.

The guideways 138 and 138' on the left-hand side of the baler are particularly illustrated in Figs. 6, 11, 28, and 29. As shown in the drawings, the guideways 138 and 138' are of similar construction. The guideway 138 is arranged to register with the upper of the openings 122a in the left-hand side of the baling chamber and the guideway 138' registers with the lower opening. Each guideway comprises upper and lower, generally triangular-shaped plates as illustrated at 157, and these plates are spaced apart to permit the passage of the needle 81 therebetween. A strip of material indicated as 159 (Fig. 28) in the drawings is desirably provided along the outer edge of each of the guideways 138 and 138' to prevent foreign materials from interfering with the operation of the needles. The rearward ends of the guideways 138 and 138' are located adjacent the twisting unit 87, as shown particularly in Fig. 12, and are open so that the needle 81 will pass freely through the openings 122a in the bale case, through the guideway 138, and into engagement with the twisting unit 87 and the holding and cutting unit 85.

One wire retainer mechanism 91 (Figs. 11 and 28) is disposed in each of the guideways 138 and 138' to hold the wire W as the movement of the compressed material through the bale case draws the strand of wire around the bale (the operation shown diagrammatically in Fig. 32). For convenience in description the wire retainer mechanism associated with the lower guideway 138' is designated as 91' in the drawings and, since the mechanism for both the upper and lower guideways 138 and 138' are of the same construction, only one will be described.

The retainer pin mechanism 91 (Figs. 28, 29, and 30) for the guideway 138 includes a mounting bracket 161 which is attached to the upper of the plates 157. The mounting bracket 161 includes a vertically extending pivot pin 163 (Fig. 29) which hingedly supports a housing 165. The housing 165 is provided with a vertically extending aperture for receiving a hollow sleeve or bushing 167 (Fig. 29), and the upper surface of the housing 165 is provided with a plurality of serrations or teeth 169 which are adapted to engage complementary serrations 171 on a cap 173. The bushing 167 is provided at its lower end with a threaded section 175 which engages the housing 165 (Fig. 29) and at the other end with an axially disposed opening for receiving a vertically extending locking pin 177.

As illustrated in Fig. 29, the locking pin 177 is provided with a shoulder 179 to form a spring abutment, and a coil spring 181 is disposed intermediate this shoulder and the upper end of the bushing 167. The upper end of the pin 177 is rigidly attached to the cap 173 by the engagement of a threaded section 184 on the pin 177 with a registering threaded section in the cap. It will be seen that rotation of the cap 173 relative to the housing 165 will cause the cap 173 and pin 177 to move upwardly against the pressure of the spring 181 as the teeth or serrations 169 and 171 pass over one another.

In order that controlled rotation of the cap 173 may be effected with the consequent vertical movement of the pin 177, the cap 173 is provided with a plurality of radially extending ratchet teeth 183. A ratchet arm 185 having a hook-shaped section 186 for engaging the ratchet teeth 183 is biased against the teeth 183 by a rod and spring connection 187, the other end of the ratchet arm 185 being connected to a lever arm 189 on the vertically extending shaft 101 of the swingable frame 105 by a vertically extending pivot 188 (Figs. 11, 28, and 29).

The lower end of the locking pin 177 extends through a pair of vertically aligned apertures 191 (Figs. 29 and 30) in the upper and lower plates 157 which form the guideway 138, so that the upward motion caused by the rotation of the pin 177 and cap 173 will momentarily lift the pin 177 from the apertures 191 to release the strand of wire W which is trained around the pin 177 during operation. This permits the wire to freely move into the baling chamber 49 through the opening 122a. It should be noted that the surfaces of the plates 157 are inwardly dished as illustrated at 193 (Figs. 29 and 30) to reduce the required vertical travel of the pin 177 and to prevent the wire from becoming lodged on any sharp projections.

In order that the shocks and strains on the retaining mechanism 91 incident to the operation of the tying mechanism do not damage the other elements of mechanism, the apertures 191 in the guideway 138 are elongated so that the housing 165 is free to swing a limited amount about the pivot pin 163, and a resilient biasing means 195 is provided intermediate the bracket 161 and the housing 165 to urge the pin 177 forwardly in the apertures 191. The biasing means includes a guide 194 attached to the support bracket 161, the guide 194 slidably supporting a rod 197 which is pivotally attached at one end to the housing 165. The rod 197 is biased forwardly (towards the forward end of the baler) by a spring 201, the spring 201 being disposed intermediate the projection 199 and a nut and washer assembly 203 on the free end of the rod 197. It has been pointed out that the holding mechanism 91' is of the same construction as the mechanism 91, and as illustrated, the mechanism 91' is biased by a spring means 194' and is operated by a ratchet arm 185' from a lever arm 189' rigidly attached to the shaft 101.

As was pointed out in the foregoing, the retainer mechanism 91 is disposed forwardly of the twisting unit 87 and holds the wire being twisted. Consequently, as the wire is twisted its effective length is decreased thereby pulling the pin 177 and the mechanism 91 rearwardly towards the twisting unit 87. This rearward movement is permitted by the spring 201 but, as soon as the wire is released by raising the pin 177, the mechanism 91 springs back to its original position at the forward end of the apertures 191.

Wire holding and cutting mechanism

In the illustrated wire tying unit, the wire holding mechanism and the wire cutting mechanism are combined into the single unit which has been generally designated as 85 in the drawings, Figs. 12, 13, 15, and 18 to 24. The combined holding and cutting unit 85 is perhaps the most critical element of the tying mechanism, and it is essential that the unit 85 operate properly if bales are to be successfully tied.

Figure 15:
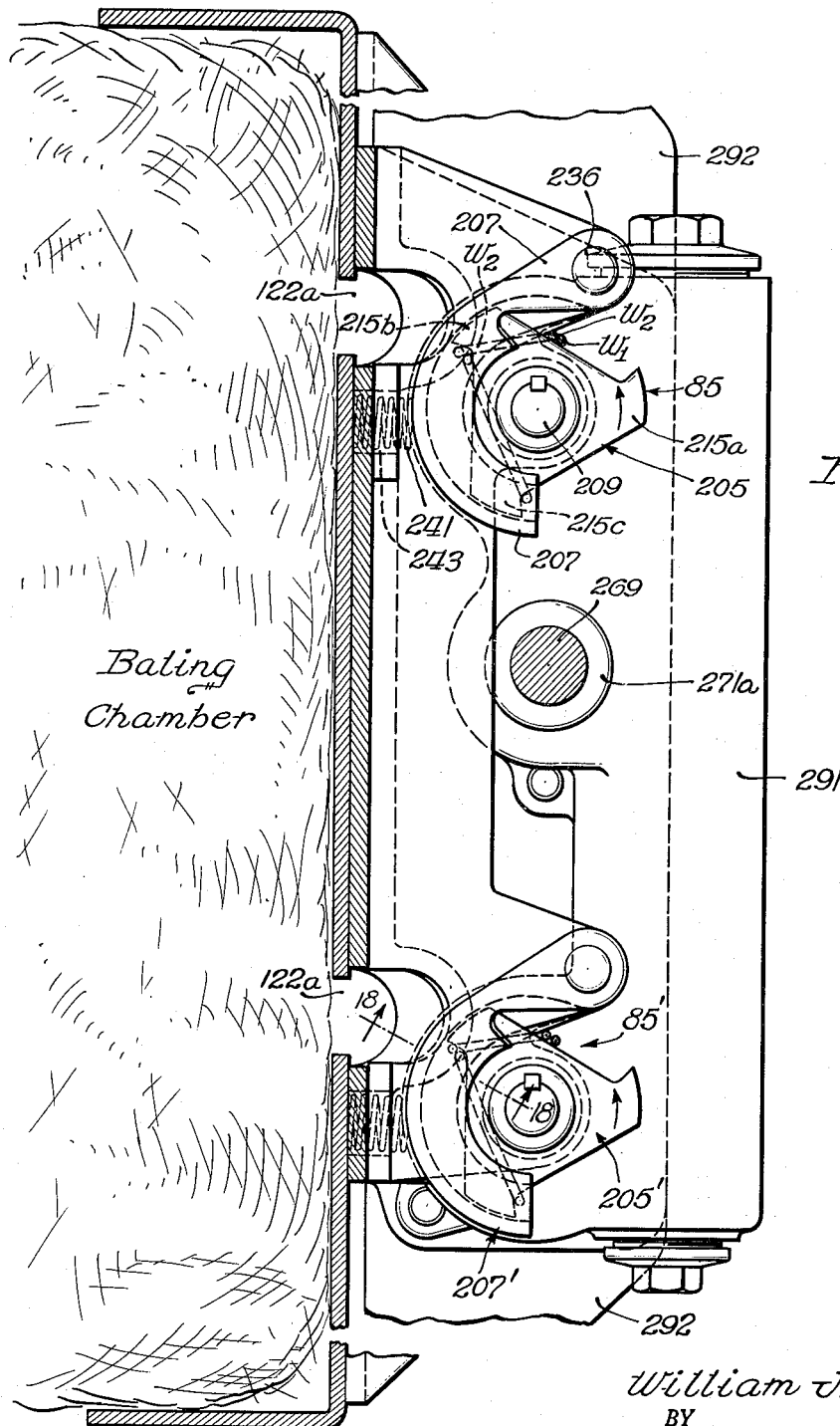
Fig. 15 is a sectional view taken on line 15—15 in Fig. 13.

As shown in Figs. 12 and 15, two holding and cutting units are provided, one, 85, being adapted to hold and cut the strand of wire W carried by the needle 81 and the other, 85', being operable to hold and cut the strand carried by the needle 81a. Since each of the units are of the same construction, only one, the unit 85, will be described in detail.

The unit 85 comprises a movable element or rotor 205 and a resiliently biased element or shroud 207 which co-act with one another to hold and to cut the wire W in synchronized relation with the operation of the other elements of the tying mechanism. The rotor 205 is keyed to a horizontally disposed, longitudinally extending shaft 209 journalled in a bearing 211 supported on the bale case C (Fig. 13). The motor 205 (Figs. 22, 23, and 24) includes a hub 213 which supports a pair of spaced apart, generally triangular sections 215 and 217 which provide a plurality of arms 215a, 215b, 215c, and 217a, 217b, and 217c, respectively. The arms radiate outwardly from the hub in pairs, 215a extending in the same direction as 217a, etc., as illustrated. Hook-shaped gripping and cutting surfaces are provided at the outer ends of each of the arms to clamp and to cut the wire as will hereinafter appear. The gripping and cutting surfaces are designated by the reference numeral of the associated arm with a double suffix, e. g., the cutting surface on arm 215a is designated by the reference numeral 215aa, etc.

As illustrated particularly in Figs. 12, 13 and 23, the triangular sections 215 and 217 are disposed in planes which are normal to the axis of the supporting shaft 209 so that the hook-shaped gripping and cutting surfaces are generally radially disposed relative to the axis of the shaft 209. The forwardmost triangular section, 215 (towards the forward end of the implement), through the action of its associated hook-shaped surfaces 215aa, 215bb, and 215cc, is adapted to cut the baling wire at the proper point in the baling operation, and the other triangular section, 217 through its associated hook-shaped surfaces 217aa, 217bb, and 217cc is adapted to hold the baling wires during the cutting operation and during the period in which a bale is being formed.

The hooked-surfaces 215aa, 215bb, and 215cc of the triangular section 215 are fabricated with sharp cutting edge 219 at the forwardmost point of each of the surfaces (Figs. 23 and 24). The edge 219 is adapted to co-act with a cutting surface 221 on the resiliently biased member or shroud 207 as will be subsequently described. The opposite edge of each of the surfaces 215aa, 215bb, and 215cc is rounded slightly, as shown at 223 in Figs. 23 and 24, to cooperate with the triangular section 217 in gripping or holding the baling wires.

The hook-shaped surfaces 217aa, 217bb, and 217cc, associated with the triangular section 217 are rounded as shown at 225 in Figs. 23 and 24, the sides of the triangular section 215 being defined, in the illustrated rotor, by planes which are normal to the axis of the supporting shaft 209. The forwardmost side of the triangular section 217 is also defined by a plane normal to the axis of rotation of the rotor 205 while the rearward face is outwardly dished to cooperate with the fixed member 207 in holding the wire.

The hook-shaped surfaces of arms 215a, 215b, 215c, 217a, 217b, and 217c of the rotor 205 are adapted to fit within the resiliently biased member or shroud 207. The shroud 207 is particularly illustrated in Figs. 15 and 19 to 21, inclusive, and provides surfaces which co-act with the rotor to hold the wire and a cutting edge 221 which cooperates with the cutting edges 219 of the rotor 205. The shroud 207 is of generally semi-circular, arcuate shape and is adapted to engage the side of the rotor 205 which is disposed adjacent the bale case C Fig. 15). A groove 227 (Fig. 21) is provided in the inner surface of the shroud 207 to receive the arms 215a, etc., of the rotor 205, and the side walls of this groove are parallel to, and in sliding contact with, the sides of the triangular section 215. The arms 217a, etc., of the triangular section 217 are disposed within a second groove 229 in the inner surface of the shroud 207, the groove 229 being separated from the groove 227 by a raised rib 231 (Fig. 21). The forward, transversely disposed surface of the groove 229 is generally plane and coacts with the plane surface of the triangular section 217, but as shown in the drawing, at 233, the rearward surface of the groove 229 is curved to provide clearance for the baling wire being held. The curved surface 233 cooperates with the outwardly dished surface on the rearward face of the section 217 to hold the baling wire during the operation of the tyer. The forward portion of the shroud 207 is cut away as illustrated at 235 (Fig. 19) to provide the cutting edge 221.

The shroud 207 is hingedly supported upon a horizontally disposed, longitudinally extending stub shaft 236 which is rigidly attached to a supporting web 237 attached to the side of the bale case C (Figs. 12, 13 and 15). The web 237 in the illustrated structure also supports the rotor shaft 209. The axes of the rotor shaft 209 and the stub shaft 236 are parallel so that the shroud 207 will swing in a plane normal to the axis of rotation of the rotor 205. The upper end of the shroud 207 is provided with an aperture 239 which extends transversely of the shroud (Fig. 19), this aperture being adapted to fit upon the stub shaft 236 to support the shroud 207. The lower end of the shroud 207 is biased toward the rotor 205 by a compression spring 241 which acts intermediate the outer surface of the shroud 207 and the bale case C. Of course, a suitable well 243 is provided in the outer surface of the bale case C to retain the spring 241 in the desired position.

During the operation of the tying mechanism, the needle 81 carrying a wire $W_1$ to be engaged by the cutting and holding unit 85 places the wire over the hook-shaped surfaces 215aa and 217aa (Fig. 15) which extend outwardly from the shaft 209. It will be assumed that a bale has been formed previously so that there will be a wire $W_2$ (Fig. 15) held between the arms 215b and 217b and the shroud 207, the arms 215b and 217b being advanced 120° from the surfaces 215aa and 217aa. The wire $W_2$ extends upwardly across the rearward face of the rotor and forwardly across the arms 215a and 217a. The wire $W_1$ deposited in the V-shaped section between the shroud and the rotor is horizontally disposed, and as soon as the wire $W_1$ is placed in the hook-like portion between the arms 215a and 217a and the shroud 217, the synchronizing and timing mechanism 73 effects a gradual 120° rotation of the rotor 205 causing the wires $W_1$ and $W_2$ to be caught between the interior surfaces of the shroud and the hook-shaped surfaces 215aa and 217aa of the rotor 205. The gradual 120° rotation takes place during the several, rather rapid rotations of the twisting elements which are to be described. This movement of the rotor 205 towards the end of the 120° rotation, also cuts the forwardly extending portions of the wires $W_1$ and $W_2$ thereby freeing those portions of the wire from the cutting and holding apparatus 85 and clamping the wire $W_1$ around the central rib 231 of the shroud 207 (Fig. 18). The strand of wire $W_1$ then extends across the arms 215c and 217c, these arms having moved into the position occupied by arms 215a and 217a in Fig. 15. Of course, the strands of wire $W_2$ is also cut so that a short U-shaped portion of the wire will be ejected from the space between the rotor 205 and the shroud 207 on the next 120° advancement of the rotor.

The crimping or bending of the wire about the central rib 231 of the shroud 207 and the holding of the wire between the curved face 233 of the groove 229 and the dished surface of the triangular section 217 is effective to prevent the wire from being pulled axially out of engagement with the rotor 205 and shroud 207. The rotation of the rotor 205, as has been pointed out, will also eject the short portions of wire cut on each cycle of the apparatus from the rotor. It should be noted particularly as shown in Fig. 18, that the arms 215a, 215b, 215c, 217a, 217b, and 217c of the rotor 205 do not extend to the base or root of the grooves 227 and 229 but rotate within these grooves with a slight clearance, thus effecting the bending of the wire about the central rib rather than a cutting of the wire.

Wire twisting mechanism

The wire twisting mechanism includes the wire twisting unit 87 which is disposed at the rearward end of the needle guideway 138 forwardly of the combined holding and cutting unit 85 and the twisting unit 87' which is disposed at the rearward end of the guideway 138' forwardly of the holding and cutting unit 85'. The twisting units 87 and 87' are disposed within a housing 245 which extends outwardly from the side of the bale case C, the outer end of the housing 245 also serving to brace the supporting brackets 97 and 99 for the swingable frame 105 (Figs. 11 and 12). The housing 245 includes a forward plate member 247 and a rearward plate member 249 which are provided with apertures 251 (Figs. 12 and 14) for receiving the rearward ends of the guideways 138 and 138'.

Figure 14:
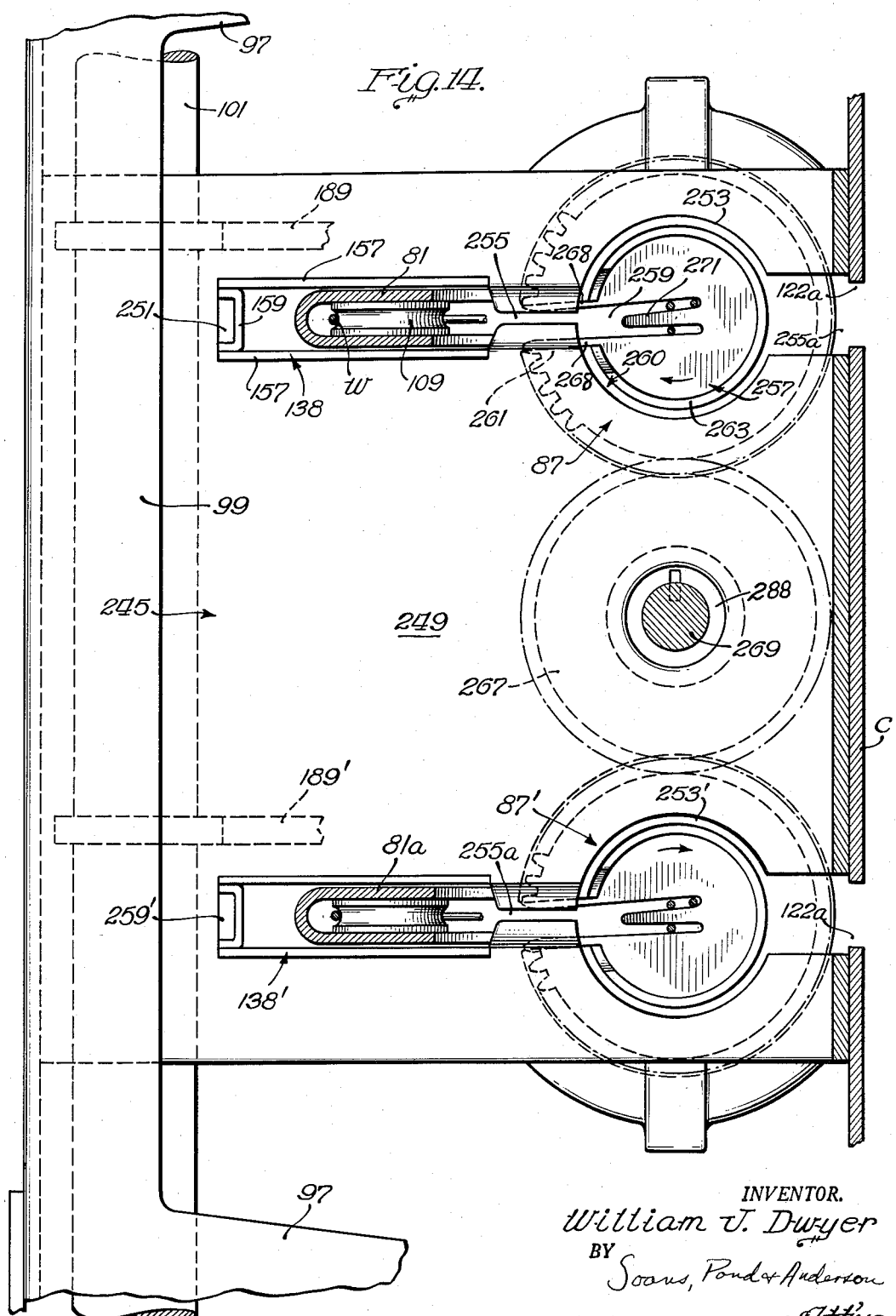
Fig. 14 is a sectional view taken on line 14—14 in Fig. 13.

The twisting units 87 and 87' are of the same construction and consequently only one, unit 87, will be described. The twisting unit 87 is located in the upper portion of the housing 245. As illustrated in Figs. 12, 13, and 14, generally circular openings 253 and 253' are provided in the plate members 247 and 249 intermediate the aperture 251 for the guideway 138, and the wall of the bale case C, and these openings 253 communicate with the associated guideway 138 and the interior of the bale case through suitable slots 255 and 255a, respectively. A twisting element 257 which comprises a spur gear having a radially extending opening 259 in the central portion thereof, is disposed within the housing 245 concentrically with the openings 253, the opening 259 communicating, at one end, with the periphery of the gear. Each of the side surfaces of the gear 257 is provided with an annular supporting member 260 (Fig. 13) which also extends outwardly to cover the teeth of the gear 257.

Each of the supporting members 260 includes an annular, radially disposed ring portion 261 which extends parallel to the side surfaces of the twisting gear 259 and an integrally formed, annular collar 263 which is disposed axially of the gear 259. The axially disposed collar 263 is proportioned to fit within one of the circular openings 253 and to be rotatable therein, while the annular ring portion 261 is attached to one side of the gear by a plurality of lugs 265. A suitable slit 268 is provided in each of the supporting members 260 to register with the radially extending opening 259 in the gear 257.

The pair of twisting mechanisms 87 and 87' are disposed one above the other in the housing 245, as illustrated, to engage the wires carried by the needles 81 and 81a. Simultaneous rotation of the twisting mechanisms 87 and 87' is effected by a driving gear 267 which is disposed in aligned, meshing relation with the twisting gears of the units 87 and 87'. The driving gear 267 is provided with spur teeth proportioned to engage the teeth on the twisting gear 257, and the end of the opening 259, communicating with the periphery of each of the twisting gears 257 is proportioned so that the gear teeth of the driving gear 267 will readily pass across the opening 259 without binding.

The driving gear 267 is attached to a longitudinally extending shaft 269 rotatably supported in a bearing 271a in the forward wall 247 of the housing 245. The forward end of the shaft 269 is connected to the timing and synchronizing means 73 at the forward end of the baler and the rearward end of the shaft 269 is connected to the driving means for the cutting and holding mechanism 85 as will hereinafter be described.

As illustrated particularly in Figs. 12 and 14, the central cut out portion 259 of each of the twisting gears 257 is provided with a radially extending finger 271 which defines a pair of slots adapted to receive the baling wires W as illustrated in Fig. 14. Desirably, each of the fingers 271 are angularly disposed relative to the central plane of the twisting gears 257 and are directed towards the rearward end of the baler (Fig. 13). This construction permits the baling wires to readily slip from the fingers after the tying operation, as will be described in a subsequent paragraph, and also affords a relatively wide surface for twisting the baling wires.

Timing and synchronizing mechanism

As has been pointed out, it is essential that the wire cutting and holding units 85 and 85', the wire twisting units 87 and 87', and the movement of the needles 81 and 81a which carry the baling wire W across the baling chamber are synchronized to effect their operations in the timed sequence. This timed operation of the various elements of the baler is effected by the timing and synchronizing mechanism 73 which includes a timing member 273 which is driven from the driving shaft 60 for the baling piston 51. The timing member is operably connected to the swingable, needle-supporting frame 105, the sealing gates 141 and 141a in the needle guideways 137 and 137', the cutting and holding units 85 and 85', and the twisting units 87 and 87'.

The timing member 273 (Figs. 2 and 3) comprises a mutilated gear wheel 275 which is supported upon a hub 277c (Fig. 4) rotatably journalled on the baling-piston shaft 60, the gear wheel 275 being adapted to rotate freely relative to the supporting shaft 60 except during such time as it is interconnected with that shaft to effect the operation of the baler elements. As illustrated in Fig. 2, the gear wheel 275 is circular in shape and includes a peripheral area having raised gear teeth arranged in spaced-apart peripheral sections 277 and 277a. The gear wheel 275 is disposed in a vertical plane and the gear teeth are on the outer or exposed face of the wheel in the illustrated baler. The toothed sections 277 and 277a are separated by plane peripheral sections 279 and 279a, the plane sections 279 and 279a lying in or below the plane containing the roots of the gear teeth in the sections 277 and 277a. A raised, outwardly extending rim 281 is disposed about each of the plane peripheral sections 279 and 279a in order to lock the driving means for the wire cutting and holding unit 85 and the twisting unit 87 except when they are actuated by the gear sections 277 and 277a of the timing member 273.

The longitudinally extending shaft 269 operably connects the gear wheel 275 with the holding and cutting units 85 and 85' and the twisting units 87 and 87', this shaft, 269, being journalled, adjacent its forward end, in a bearing 285 on the side of the bale case C. The forward end of the shaft 269 carries a pinion gear 287 which is provided with a generally rectangular shaped locking collar 289 integrally attached to the pinion gear 287 as shown in Figs. 2 and 2a. The locking collar 289 is proportioned so that one of its sides engages the rim 281 on the gear wheel 275 (Fig. 2a). Since the plane peripheral sections 277 and 277a of the gear wheel 275 are disposed on a level with, or below, the roots of the gear teeth in sections 277 and 277a, the pinion 287 is not engaged by the gear wheel 275 except when the toothed sections 277 and 277a move across the pinion 287. When the pinion 287 is disposed over the plane sections 279 and 279a, the rectangular shaped locking collar 289 rides on the raised rim 281 about the periphery of the gear wheel 275 to lock the pinion 287 in a fixed position, thus locking the twisting gears 257 and the rotor 205 in a predetermined position.

Both the wire holding and cutting units 85 and 85' and the twisting units 87 and 87' are driven from the rearward end of the shaft 269, the shaft 269 extending rearwardly to the bearing 271 in the twisting unit housing 245. The shaft 269 also serves to support the driving gear 267 for the twisting unit 87. The shaft 269 then extends rearwardly through an opening 288 in the rearward wall 249 of the housing 245 (Fig. 14). The rearward end of the shaft 269 is rotatably journalled in a bearing 289 (Fig. 17) supported in a gear housing 291 at the rearward end of the bale case C. The gear housing 291 which is attached to a vertically extending frame member 292 on the bale case C, is generally vertically extending and is provided with a pair of branch sections which are adapted to receive the rearward ends of the rotor-supporting shafts 209 and 209' of the holding and cutting units 85 and 85', respectively.

Figure 16:
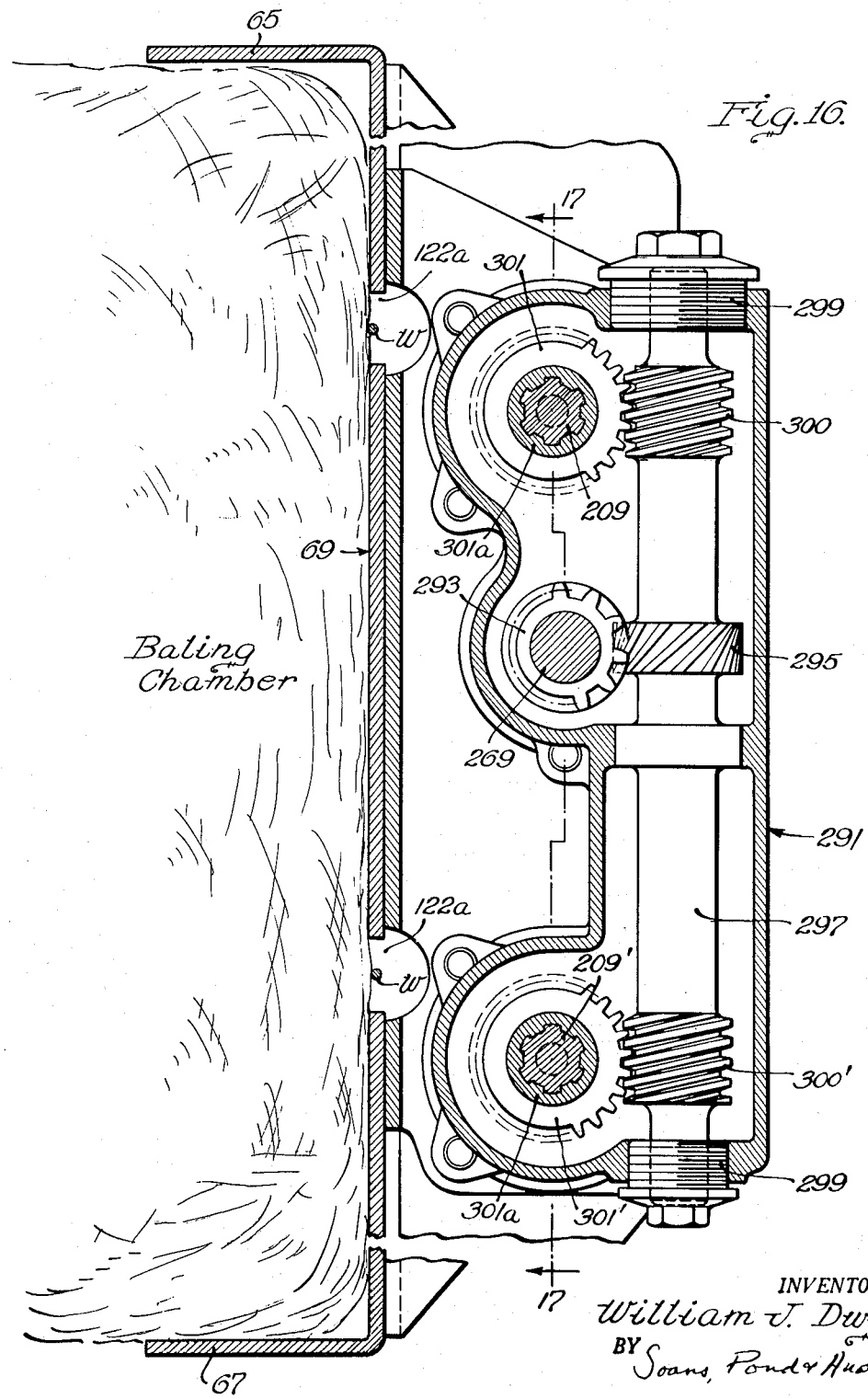
Fig. 16 is a sectional view illustrating the driving means for the wire holding and clamping unit illustrated in Figs. 13 and 15.
Figure 17:
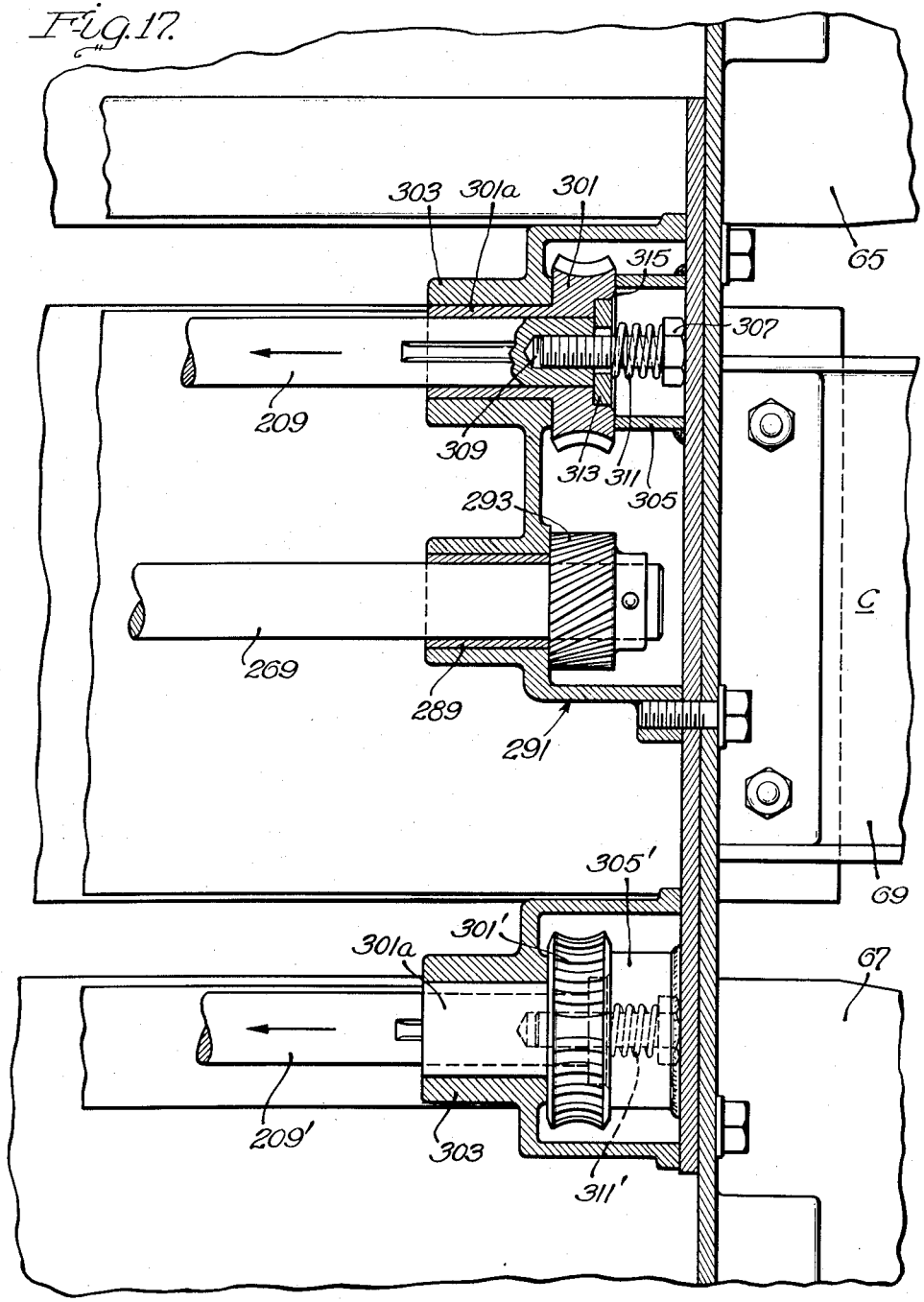
Fig. 17 is a sectional view taken on line 17—17 in Fig. 16.

The drive for the holding and cutting units 85 and 85' includes a screw gear 293 which is attached to the rearward end of the shaft 269 (located inside of the housing 291). The gear 293 is engaged by a screw gear 295 attached to a vertically extending shaft 297 which is journalled at each end in suitable bearing 299 at the upper and lower ends of the vertically extending portion of the housing 291 (Fig. 16). A worm 300 is attached adjacent the upper end of the shaft 297 and a second worm 300' is attached to the lower end of the shaft 297. The worms 300 and 300' are engaged by worm wheels 301, 301', respectively, each of which includes a hub 301a journalled in a bearing 303 in the housing 291 (Fig. 17). As shown particularly in Fig. 17, the rearward end of each of the rotor shafts 209 and 209' is splined and is supported for slidable longitudinal movement within the hubs 301a of the worm wheels 301 and 301', respectively. In order to prevent end play or longitudinal movement of the worm wheels 301 and 301' within the housing 291, annular bearing members 305 are disposed intermediate the worm wheels 301 and 301' and the rearward wall of the housing 291.

During the twisting operation, the wire is held between the wire holding and cutting units 85 and 85' and the retainer mechanisms 91 and 91' while it is being acted upon by the twisting units 87 and 87'. As has been pointed out, the retainer mechanisms 91 and 91' are yieldable towards the associated twisting units 87 and 87' to compensate for the differences in length of the untwisted and twisted bailing wire. However, since the twisting units 87 and 87' are fixed, longitudinally of the baler, it is desirable that the cutting and holding units 85 and 85' be yieldable to compensate for the shortening of the wire between the holding and cutting units 85 and 85' and the twisting units 87 and 87'.

In the illustrated drive mechanism, it will be noted that the supporting shafts 209 and 209' for the rotors 205 of the wire holding and cutting units are longitudinally slidable in the bearings 211 and in the splined central opening in the hubs 301a of the worm wheels 301 and 301' and that the shrouds 207 of the cutting and holding units 85 and 85' are slidable on their supporting studs 236 (Figs. 13 and 15). In order to resiliently bias the cutting and holding units 85 and 85' away from the twisting unit 87 (rearwardly), a pair of cap screws 307 are threaded into an opening 309 disposed along the axes of the shafts 209 and 209', the studs constituting a guide for compression springs 311. The springs 311 act intermediate the head of the cap screws 307 and a pair of washers 313, one of which is engaged in a depression or recess 315 in the rearward face of the worm wheel 301 and the worm wheel 301'. Thus, forwardly directed forces on the shafts 209 and 209' will cause the splined portions of those shafts to slide longitudinally within the hubs 301a of the worm wheels 301 and 301', this forward motion being resisted by the springs 311.

The cap screws 307 may be moved into or out of the openings 309 to determine the position of the rotor 205 and the shroud 207 of each of the units 87 and 87' when the wire is untwisted, this position being maintained by the abutment of the head of the cap screws 307 against the rearward wall of the housing 291.

Thus, since the holding and clamping units 85 and 85' and the twisting units 87 and 87' are geared together, the units will be driven in timed relation to one another. Desirably the gearing between the units is designed to cause the twisting gears 257 to make 4 revolutions for each 120° rotation of the rotors 205. This will be explained in greater detail in a section of the description relation to the operation of the tying mechanism.

The inner face of the gear wheel 275, that is the face adjacent the bailing chamber, is fabricated with an outwardly dished section which defines a pair of raised, arcuate guides 317 and 317a (Fig. 3) which constitute a guideway for a cam roller 319 on the inner face of the gear wheel 275. The roller 319 is rotatably supported upon a horizontally disposed pivot 321 attached to the contral portion of a lever arm 323 whose upper end is pivotally attached to the main frame 41 by means of a transversely extending, horizontally disposed pivot 325. The lower end of the lever arm 323 is connected to the swingable frame 105 supporting the needles 81 and 81a by the longitudinally extending pitman 129. This connection includes a shackle 327 connected to the arm 323 by a transversely extending, horizontally disposed pivot 329 and a bifurcated member 331 which connects the pitman 129 to the shackle, the latter connection being made by a vertically extending pin 333. As has been pointed out previously, the rearward end of the pitman 129 is pivotally attached to the lower section 105b of the U-shaped frame 105 and to an associated auxiliary arm 131 by a universal joint 133. It will be noted from the drawings that the camming guideway defined by the ribs 317 and 317a is so proportioned that the needles 81 and 81a will be swung across the baling chamber at the proper time during the rotation of the timing member 273.

The timing member 273 is interconnected with the supporting shaft 60 for rotation with that shaft, at the proper point in the baling operation by a single-turn clutch 335 which effects 360° rotation of the timing member 273 in response to the actuation of the bale gauge mechanism 77. The clutch 335 (illustrated in Figs. 3, 4, and 5) includes a hollowed out hub 337 (Fig. 5) which is keyed to the supporting shaft 60. The hub 337 is disposed on the outer end of the shaft 60 and includes an annular, inwardly extending section 339 which defines a cam way 341 (Figs. 3 and 5) having a cam abutment 343. A camming arm 345 is pivotally supported on the hub 277 of the timing member 273, adjacent its central portion, by a pivot pin 347 which extends parallel to the supporting shaft 60. Desirably both ends of the pin 347 are supported, and, in this connection, the hub 277 of the timing member 273 is extended outwardly along the shaft 60 to provide a web 349 (Fig. 4) for supporting the outer end of the pivot pin 347.

The outer end of the camming arm 345 is provided with a curved end section or toe 351 (Fig. 3) for engaging a control lever 353, and this toe extends outwardly through an aperture 355 (Fig. 4) in the hub 277 of the timing member 273. The other end of the camming arm 345, opposite the toe 351, is provided with an eye 357 which is adapted to receive one end of a coil spring 359, the other end of the spring 359 being rigidly attached to the central portion of the timing member 273 by a pin 361.

The camming arm 345 is provided with suitable bosses (not shown) for rotatably supporting a clutch roller 363 which swings inwardly and outwardly with the camming arm 345 about the pivot 347. Control of the camming arm 345 and the associated clutch roller 363 is effected by the generally vertically extending lever arm 353, this arm being pivotally supported intermediate its ends upon a transversely extending, horizontally disposed pivot 365 which is attached to the side of the baling chamber. The lower end of the arm 353 carries a roller 367 which is adapted to engage the toe 351 of the camming arm 345 (Fig. 3).

The lever arm 353 is biased into engagement with the toe end 351 of the camming arm 345 by a coiled spring 381 which extends between the upper end of the lever 353 and a fixed bracket 383 on the baler frame. The lower end of the lever arm 353 is also connected to a lever 369 by a compression resisting link 371. The lever 369 is attached to the end of a transversely extending shaft 373 journalled in bearings 375 on the main frame 41. The shaft 373 extends across the baler, and its outer end is provided with an arm 377 (Fig. 3) which is interconnected with the control pitman 147 for the needle control gates 141 and 141a. The connection between the lever arm 377 and the pitman 147 is desirably accomplished by a resilient, lost motion connection 379 which opens the gates 141 and 141a by yieldingly actuating the pitman 147. However, the pitman 147 may move rearwardly without closing the gates, as for example, before needles 81 and 81a have been retracted, or in the event that the gates 141 and 141a are jammed due to materials becoming wedged into the openings 122. The gates are yieldingly closed by a spring 382, Fig. 3, interposed in tension between pitman 147 and a portion 382a of main frame 41 in a direction to bias pitman 147 toward closing of gates 141 and 141a.

*Bale gauge mechanism*

As pointed out in the foregoing, the timing member 273 energizes the tying elements at intervals measured by the passage of predetermined lengths of compressed material through the bale case C, the timing member being operatively connected during such intervals with the shaft 60 associated with the continuously reciprocating piston 51. Energization of the timing member 273 is effected by a linkage 75 (Figs. 3 and 25) controlled by a gauge wheel mechanism 77 (Figs. 25 and 26) which engages the upper surface of the traveling compressed material through an opening 385 in the upper surface 65 of the bale case C.

The gauge wheel mechanism 77 includes a generally vertically extending supporting bracket 387 which is attached at its lower end to the upper surface of the bale case C. The upper end of the bracket 387 is braced by a member 389 whose lower end is connected to the side of the bale case C. A gauge wheel 390, which includes a spider 391 having three equally spaced arms 393, is disposed above the opening 385 and is rotatably attached to the vertically extending bracket 387 by a transversely disposed, horizontally extending stud 395. A plurality of segments 397 are attached to the arms 393 of the spider 391 in such a manner that the segments 397 may be moved radially inwardly or outwardly relative to the axis of rotation of the spider 391. By reference to Figure 26, it will be apparent that movement of the segments 397 outwardly increases the perimeter of the gauge wheel 390 and, as a result, increases the length of each bale formed by the baler in view of the fact that increased amounts of material will pass under the wheel prior to tripping the linkage 75. The periphery of each of the segments 397 is toothed, as illustrated, in order to firmly engage the material being baled and thereby turn the wheel 390 without slippage.

The linkage 75 is tripped by a pawl 399 which extends inwardly from the gauge wheel 390, intermediate the wheel and the supporting bracket 387. The pawl 399 is adapted to swing across and to engage a generally vertically extending lever 401 which is attached to the end of a transversely extending, horizontally disposed shaft 403. The shaft 403 is journalled in bearings 405 on the bracket 387 and on the member 389, and cotter pins 404 are inserted through the shaft 403 adjacent the bearing 405 and member 389 to prevent axial movement of the shaft during operation. It will be seen from the drawings (Figures 25 and 26) that movement of the pawl 399 past the lever 401, as the spider 391 and segments 397 rotate, will cause the shaft 403 to turn, about 60°, thus causing a depending arm 407 located at the other end of the shaft 403 to move rearwardly along the sides of the bale case C. The arm 407 is pivotally attached to the rearward end of a longitudinally extending shaft 409 whose forward end is attached to the upper end of the lever 353 (Fig. 3); the depending arm 407, the shaft 409 and the pivotal connection constitute the linkage 75.

During operation of the baler, it is important that the pawl 399 trip the lever 401 as rapidly as possible in order to prevent repetitive functioning of the tying mechanism which might damage that mechanism or other parts of the baler. Improper tripping of the lever 401 is most likely to occur when the baler is stopped, and the pawl 399 comes to rest under the lever 401. In order to assure proper operation under this condition, the pawl 399 is connected to the rotating gauge wheel 390 through a resilient, lost motion connection. This connection is provided by supporting the pawl 399 upon an arm 500 which is pivotally mounted upon the stud 395, the arm 500 being located outwardly of the wheel 390 (Fig. 25) relative to the supporting bracket 387. A shank 501 is attached adjacent the outwardmost end of the arm 500; and this shank extends inwardly through an elongated slot 502 formed in one of the segments 397 of the wheel 390 and mounts the pawl 399 on the inwardmost or extended end thereof, so as to be in position to engage the lever 401. The slot is generally arc shaped and its edges are approximately concentric with the periphery of the wheel 390 (Fig. 26). If the operation of the baler will require substantial movement of the segments 397, it may be found advantageous to adjust the pawl support shank 501 a corresponding amount with respect to its support arm 500. This can be done by adjustment of the fastening nuts 501a. For normal operation, sufficient adjustment of the wheel 390 can be accomplished by using a slot 502 wide enough to accommodate the accompanying relative movement of the segment and the shank 501.

The shank 501 is normally biased against the leading edge (relative to the direction of rotation of the wheel 390) of the slot 502 by a tension spring 503, that is it is biased toward the right hand end of the slot 502 as shown in Fig. 26. The spring 503 is connected between the arm 500 and a lug 504 attached to the wheel 390 and, as a result, the arm 500 rotates about the stud 395, substantially following the rotation of the wheel. When the wheel 390 rotates to the position wherein the pawl 399 engages the lever 401, the rotation of the shank 501 supporting the pawl 399 is retarded causing the pawl 399 to be positioned toward the left or trailing edge of the slot thereby storing energy in the spring 503. This position of the pawl 399 and the shank 501 is illustrated in Fig. 26. In this connection, the tension spring is adjusted to exert a force on the pawl 399 which is less than the forces biasing the lever 401.

During operation, as the gauge wheel 390 rotates with respect to movement of the compressed material in the bale case C, the pawl 399 will engage the lever 401, thus causing the shank 501 to move to the left in slot 502. When the shank 501 engages the left hand edge of the slot 502, as shown in Fig. 26, the pawl 399 is positively moved past the lever 401, and after the tripping action is started, the stored energy in the spring 503 hastens this movement of the pawl 399. This obviates the possibility of repetitive or other improper operation of the tying mechanism. Tripping of the lever 401 causes the rod 409 to move rearwardly of the bale case C to pivot the lever 353, thereby causing that lever to release the toe 351 of the camming arm 345 from the roller 367 of the single-turn clutch 335. The action of the spring 359 then causes the clutch roller 363 to move outwardly to engage the cam abutment 343. The engagement of the clutch roller 363 with the abutment 343 interlocks the shaft 60 with the timing member 273. The timing member 273 will then rotate one revolution or until the toe 351 of the camming arm 345 is again engaged by the roller 367 attached to the lower end of the lever arm 353. Since the spring 381 returns the lever arm 353 to its initial position immediately after it is displaced by the gauge mechanism 77, the roller 367 on the lever arm 353 will re-engage the toe 351 as soon as the timing member 273 completes a 360° revolution. Simultaneously with the release of the timing member, the lever 353 also effects longitudinal movement of the rod 147 which withdraws the needle gates 141 and 141a from the openings 122 in the bale case thus enabling the needles 81 and 81a to enter these openings.

*Operation*

The operation of the illustrated baler will now be described rather specifically. As the baler is moved along the filed, crop materials are continuously gathered by the pick-up unit P which carries the material to the conveyor 61. The conveyor 61 deposits the crop material in the inlet opening 50 of the baling chamber 49 and the reciprocating feeder head 63 pushes the material through the inlet opening 50 into the baling chamber 49. The material in the baling chamber 49 is compressed and moved rearwardly on each stroke of the piston 51, and as has been pointed out, the knife blade 53 on the piston 51 and the stationary knife blade 55 on the rearward edge of the opening 50 co-act to sever the material compressed on each stroke of the piston from the incoming crop materials.

Referring to Fig. 31, a bale B has just been completed and is moving rearwardly in the bale case towards the discharge opening at the rearward end thereof under the action of the baling piston 51 which is continuously compressing material behind the formed bale. At this point in the operation, one end of the baling wire, the strand designated by the reference numeral $W_3$ in Fig. 31, is clamped in the cutting and holding unit 85 between the rotor 205 and the shroud 207. The end of the strand $W_3$ is in the position of strand $W_2$ in Fig. 15 and is bent between the rib 231 in the shroud 207 and the hook-shaped arms 215b and 217b of the rotor 205 (shown in detail in Fig. 18). The strand $W_3$ then extends across the rearward face of the triangular section 217 of the rotor 205 and forwardly between the shroud 207 and the arms 215a and 217a of the rotor 205—the strand $W_3$ is in the same position as the strand $W_2$ in Fig. 15.

The strand of wire $W_3$ which is clamped in the holding and cutting unit 85, as described, extends forwardly from the unit 85 to the guideway 138, the wire being disposed in the slot 255 intermediate the twisting unit 87 and that guideway and being prevented from engaging the teeth of the twisting gear 257 by the annular disks 261. The wire-receiving opening 259 in the twisting gear 257 is disposed towards the wall of the baling chamber, that is towards the slot 255a, Fig. 14. The strand $W_3$ is then trained around the pin 177 of the retaining mechanism 91 and finally extends across the baling chamber passing through the openings 122 and 122a in the side walls of that chamber. The strand of wire $W_3$ forms a continuation of the wire stored in the coil 115 which is supported in the container 79 on the side of the bale case C. At this point in the operation the pinion gear 287 is disposed approximately midway between the toothed sections 277 and 277a of the gear wheel, i. e., at substantially the mid-point of the plane peripheral section of the gear wheel 279 (Fig. 2). In this position the shaft 269 which energizes the tying and cutting and holding units is locked in position by the engagement of the locking collar 289 with the rim 281.

As the compressed crop material is moved rearwardly in the baling chamber 49 under the action of the piston 51, the baling wire is drawn from the coil 115 and pays out of the needle 81 until the crop material has advanced to substantially the position shown in Fig. 32. At this point it will be seen that a strand of wire $W_4$ extends from the pin 177, through the slot 255a intermediate the twisting member and the bale case C and into the opening 259 in the central portion of the twisting member 257 (Fig. 32).

When the compressed material has advanced a bale length, the rotation of the gauge wheel 390 causes the pawl 399 to act upon the arm 401 which in turn actuates the control lever arm 353 through the medium of the longitudinally extending control rod 409. The lever arm 353 is moved forwardly against the tension of the spring 381 and pivots about the axis provided by the pivot pin 365. This movement retracts the roller 367 from the toe 351 of the camming arm 345 causing the clutch roller 363 to move outwardly under the action of the spring 359 to engage the cam abutment 343. When the roller 363 is in contact with the abutment 343 the timing member 273 and the shaft 60 are locked together and constitute a single rotatable unit. Simultaneously with the release of the hook member 351, the lower end of the arm 353 acts through the link 371, the interconnected arms 369 and 377, and the pitman 147 to open the needle gates 141 and 141a which have previously covered the openings 122 through which the needles 81 and 81a must pass to enter the baling chamber.

The engagement of the clutch roller 363 with the abutment 343 causes the timing member 273 to rotate thereby initiating the tying cycle of the mechanism and moving the cam roller 319 forwardly at the proper time, under the camming action of the ribs 317 and 317a. Forward longitudinal movement of the cam roller 319 moves the lower end of the control arm 323 forwardly which in turn swings the needles 81 and 81a inwardly across the baling chamber through the slots 95 in the forward face of the baling piston 51 (Fig. 33). Before the needles 81 and 81a swing inwardly, the gear section 277a on the gear wheel portion 275 of the timing member 273 engages the pinion 287. The pinion 287 rotates the shaft 269 which in turn rotates the twisting gear 257, associated with each of the twisting units 87 and 87' an angle less than 360°, in the illustrated baler 180°. This 180° rotation carries the strand $W_4$ to the outer side of the twisting unit, Fig. 33. This rotation also causes the strand $W_3$ to enter the opening 259 in the twisting member 257. During this period, the needles 81 and 81a start to swing across the baling chamber under the action of the camming ribs 317 and 317a to lay a strand of wire $W_5$ around the pins 177 of the retaining mechanisms 91 and 91'. The swinging movement of the needles 81 and 81a carries the strand $W_5$ into the opening 259 in the twisting gear 257 and across the arms 217a and 215a of the rotor 205 of the holding and cutting units 85 and 85'. The strand $W_5$ is placed in parallel side by side relation with the horizontally extending portion of the strand $W_3$ already in the units 85 and 85'.

At the time that the strand $W_5$ is placed across the rotor 205, the pinion 287 is engaged by the gear section 277 on the timing member 273 which causes the shaft 269 to rotate the twisting gear 257 two and one-half revolutions (Fig. 35) thereby causing the rotors 205 of the holding and cutting units to advance about 70°. This advancement of the rotor 205 together with the 15° rotation caused by the 180° rotation of the interconnected twisting member 257 moves the arms 215a and 217a to a position wherein the strands $W_3$ and $W_5$ are closely held between the rotor arms and the shroud 207.

The twisting gear 257 and the rotor 205 continue to rotate until the twisting gear has completed 3½ turns (one additional rotation after the 2½ turns which have been described) and the rotor 205 has advanced another 30°. This additional rotation of the rotor 205 causes the cutting edge 219 on the arm 215a to engage the edge 221 on the shroud 207 thereby cutting the strands $W_3$ and $W_5$. The severed strands of wire then spring inwardly towards the baled material since the bale is under considerable compression and the twisting operation has effectively shortened the length of the wire about the bale. At this point in the operation the opening 259 in the twisting gear 257 is disposed towards the baled material and the twisted baling wire slips from the finger 271 which constitutes a central division for the opening 259. As pointed out above in the description of the wire twisting mechanism, the angular disposition of the finger 271 affords ready release of the knot from the twisting gear, under the tension exerted on the baling wire by the compressed bale of material, when the finger 271 and the opening 259 are aligned in position on the bale side of the twisting mechanism. The angular disposition of the finger 271 (Fig. 13) toward the rear end of the bale is generally in the direction of the tension force of the wire and, consequently, no additional means is required to effect a movement of the twisted strand away from engagement with the twisting mechanism. As has been pointed out, the pin 177 of the retaining mechanisms 91 and 91' and the rotors 205 and the shrouds 207 of the cutting and holding mechanisms 85 and 85' move toward the twisting gears 257 against the tension of the springs 201 and 311 respectively, thus compensating for the length of wire intermediate these units.

The twisting gear may make any convenient total number of turns but, of course, the rotor of the holding and cutting unit must be so geared that it describes the proper angle on each cycle of the tying unit. It has been found that the twisting gear should rotate at least two times after the initial partial rotation of the gear and the rotation should be such that the gear stops with the slot disposed towards the bale to release the wire after it is tied.

The ribs 317 and 317a which constitute a camming guideway for the cam roller 319 then actuate the needles 81 and 81a to withdraw them from the baling chamber 49, laying a strand $W_6$ (Figs. 36, 37, and 38) across the holding and cutting units 85 and 85', across the twisting gears 257, and around the pins 177 in the retaining mechanisms 91 and 91'. The outward swinging of the needles 81 and 81a effects the rotation of the supporting shaft 101 for the swingable frame 105 and this causes the ratchet 183 and the ratchet arm 185 to lift the pin 177 from the guideways 138 and 138', momentarily, thereby releasing the tied wires of the previous bale. As the needles reach their outermost position, the force of the spring 382 through the pitman 147 and the arm 377 forces the gates 141 and 141a into the closed position thereby sealing the openings into the baling chamber. The entire operation is then repeated when the gauge wheel 390 again trips the clutch.

In the foregoing there has been described an improved baler the various features of which cooperate to continuously compress crop materials and to automatically subdivide the compressed materials into bales of the desired length. Further, the described baler includes means for automatically forming a pair of wire bale ties about the compressed crop materials. Various elements of the mechanism cooperate to securely tie a bale in a minimum length of time.

Moreover, in addition to the overall or general improvement in balers, the illustrated baler includes improved units for passing a baling wire across a baling chamber, for holding and cutting the baling wire, and for twisting the wire into a tie. Each of these units are so constructed as to minimize repair and maintenance expenses and to assure long and troublefree operation. The arrangement of the supporting means for the retaining mechanism, the twisting mechanism, and the holding and cutting unit makes possible smooth and efficient operation since all of these elements are maintained in aligned relation and are supported in a manner such that the twisting of the wires to form the tie does not interfere with the operation of the units.

Various of the features of the invention which are believed to be new are set forth in the appended claims.

I claim:

1. In combination in a baler, means defining an elongated chamber, a piston reciprocably supported in said chamber for compressing crop materials and for moving the compressed materials therethrough, means for reciprocating said piston including a continuously rotating shaft, means for carrying a strand of wire across said chamber, a gate at the side of said chamber positioned to block the path of said wire carrying means at selected periods in the operation of the baler, means for holding and cutting said wire after it has been carried across said chamber, wire twisting means positioned adjacent said wire holding and cutting means for forming a bale tie, wire retaining means spaced from said holding and cutting means, a bale gauge positioned to engage the crop material being moved through said chamber, a timing means including a gear member and a cam member, a clutch for interengaging said timing means with said shaft to rotate said gear member and said cam member, means operatively connecting said clutch and said gate with said bale gauge to simultaneously effect engagement of said timing means and said shaft and to withdraw said gate from the path of said wire carrying means in response to the passage of a predetermined amount of crop materials through said chamber, means operatively connecting said timing gear to said twisting means and said holding and cutting means, means connecting said timing cam with said wire carrying means, and means interconnecting said wire retaining means and said wire carrying means.

2. In combination in a baler, means defining an elongated chamber, a piston reciprocably supported in said chamber for compressing crop materials and for moving the compressed materials therethrough, means for reciprocating said piston including a continuously rotating shaft, means positioned at one side of said chamber for holding and cutting a strand of wire, a member normally positioned at the other side of said chamber and movable across said chamber for carrying a strand of wire thereacross and delivering it to said holding and cutting unit, a rotatable twisting member positioned adjacent said wire holding and cutting means for twisting portions of said strand together to form a bale tie, a bale gauge positioned to engage the crop material being moved through said chamber, a timing means including a mutilated gear member and means for moving said wire carrying member across said chamber, a clutch for interengaging said timing means with said shaft to rotate said gear member, means operatively connecting said clutch with said bale gauge to effect the interengagement of said timing means and said shaft in response to the passage of a predetermined amount of crop materials through said chamber, and means operatively connecting said mutilated gear to said rotatable twisting member and said holding and cutting means, said mutilated gear being proportioned to rotate said twisting member at least about 180° prior to the movement of said wire carrying member across said chamber and to rotate a plurality of additional revolutions after said wire carrying member has delivered said strand of wire to said holding and cutting unit thereby twisting portions of said strand of wire together.

3. In combination in a baler, means defining an elongated chamber, a piston reciprocably supported in said chamber for compressing crop materials and for moving the compressed materials therethrough, means for reciprocating said piston including a continuously rotating shaft, means positioned at one side of said chamber for holding and cutting a strand of wire, a member positioned normally at the other side of said chamber and movable across said chamber for carrying a strand of wire thereacross and delivering it to said holding and cutting unit, a rotatable twisting member positioned adjacent said wire holding and cutting means for twisting portions of said strand together to form a bale tie, a bale gauge positioned to engage the crop material being moved through said chamber, a timing means including a mutilated gear member and means for moving said wire carrying member across said chamber, a clutch for interengaging said timing means with said shaft to rotate said gear member, means operatively connecting said clutch with said bale gauge to effect the interengagement of said timing means and said shaft in response to the passage of a predetermined amount of crop materials through said chamber, and means operatively connecting said mutilated gear to said rotatable twisting member and said holding and cutting means, said mutilated gear being proportioned to rotate said twisting member through an angle which is less than 360° prior to the movement of said wire carrying member across said chamber and to rotate through a plurality of turns plus an angle which is equal to 360° less the angle of initial rotation after said wire carrying member has delivered said strand of wire to said holding and cutting unit thereby twisting portions of said strand of wire together, during the last revolution of said plurality of turns, said mutilated gear being operable to cause said holding and cutting unit to operate to sever said twisted wires from the strand carried by said wire carrying member.

4. In combination in a baler, means defining an elongated chamber, a piston reciprocably supported in said chamber for compressing crop materials and for moving the compressed materials therethrough, means for reciprocating said piston including a continuously rotating shaft, means for holding and cutting a strand of wire, a member movable across said chamber for carrying a strand of wire thereacross and delivering it to said holding and cutting unit, a rotatable twisting member positioned adjacent said wire holding and cutting means for twisting portions of said strand together to form a bale tie, said twisting member including a slot for receiving said wire, a bale gauge positioned to engage the crop material being moved through said chamber, the moving material within said chamber carrying a strand of wire disposed across said chamber into the slot of said twisting member, a timing means including a mutilated gear having a pair of circumferentially disposed toothed sections which are separated by non-toothed sections and including means operatively connected with said wire carrying member for moving said wire carrying member across said chamber, a clutch for interengaging said timing means with said shaft to rotate said gear one revolution and to then automatically disengage said timing member from said shaft, means operatively connecting said clutch with said bale gauge to effect the interengagement of said timing means and said shaft in response to the passage of a predetermined amount of crop materials through said chamber, and a second gear positioned to engage the toothed sections of said mutilated gear, a shaft connecting said second gear to said rotatable twisting member and said holding and cutting means, one of the toothed sections of said mutilated gear being proportioned to rotate said twisting member to trap the wire disposed in said slot as said wire carrying member is moved across said chamber under the action of said timing member, and the other of the toothed sections of said mutilated gear being proportioned to rotate said twisting member a plurality of turns after said wire carrying member has delivered another portion of said strand of wire into the slot of said twisting unit and to said holding and cutting unit thereby twisting the portions of said strand of wire together.

5. In combination in a baler, means defining an elongated chamber, a piston reciprocably supported in said chamber for compressing crop materials and for moving the compressed materials therethrough, means for reciprocating said piston including a continuously rotating shaft, means for holding and cutting a strand of wire including a rotatable member which is operable to cut a strand of wire held thereby in one portion of its operating cycle, a member movable across said chamber for carrying a strand of wire thereacross and delivering it to said holding and cutting unit, a rotatable twisting member positioned adjacent said wire holding and cutting means for twisting portions of said strand together to form a bale tie, a bale gauge positioned to engage the crop material being moved through said chamber, a timing means including a mutilated gear having a pair of circumferentially disposed toothed sections which are separated by non-toothed sections and including means operatively connected with said wire carrying member for moving said wire carrying member across said chamber, a clutch for interengaging said timing means with said shaft to rotate said gear one revolution and to then automatically disengage said timing means from said shaft, means operatively connecting said clutch with said bale gauge to effect the interengagement of said timing means and said shaft in response to the passage of a predetermined amount of crop materials through said chamber, a second gear positioned to engage the toothed sections of said mutilated gear, and means including a shaft connecting said second gear to said rotatable twisting member and said rotatable member of said holding and cutting means, one of the toothed sections of said mutilated gear being proportioned to rotate said twisting member about 180° as said wire carrying member is moved across said chamber under the action of said timing member, and the other of the toothed sections of said mutilated gear being proportioned to rotate said twisting member $(n+\frac{1}{2})$ revolutions where $n$ is at least 2 more revolutions after said wire carrying member has delivered said strand of wire to said holding and cutting unit thereby twisting portions of said strand of wire together and the last revolution of said $(n+\frac{1}{2})$ revolutions being operable to move said rotatable member to the portion of its operating cycle where the wire constituting the bale tie is severed from the strand of wire carried by said wire carrying member.

6. In combination in a baler, means defining an elongated chamber, a piston reciprocably supported in said chamber for compressing crop materials and for moving the compressed materials therethrough, means for reciprocating said piston including a continuously rotating shaft, means for holding and cutting a strand of wire including a rotatable member which is operable to cut a strand of wire held thereby in one portion of its operating cycle, a member movable across said chamber for carrying a strand of wire thereacross and delivering it to said holding and cutting unit, a rotatable twisting member positioned adjacent said wire holding and cutting means for twisting portions of said strand together to form a bale tie, a bale gauge positioned to engage the crop material being moved through said chamber, a timing means including a cam and a mutilated gear having a pair of circumferentially disposed toothed sections which are separated by non-toothed sections, a clutch for interengaging said timing means with said shaft to rotate said gear and said cam one revolution and to then automatically interrupt the rotation of said timing means, means operatively connecting said clutch with said bale gauge to effect the interengagement of said timing means and said shaft in response to the passage of a predetermined amount of crop materials through said chamber, means operably interconnecting said cam with said wire carrying member, a second gear positioned to engage the toothed sections of said mutilated gear, and means including a shaft connecting said second gear to said rotatable twisting member and said rotatable member of said holding and cutting means, one of the toothed sections of said mutilated gear being proportioned to rotate said twisting member about 180° as said wire carrying member is moved across said chamber by said cam, and the other of the toothed sections of said mutilated gear being proportioned to rotate said twisting member $(n+\frac{1}{2})$ revolutions, where $n$ is at least 2, after said wire carrying member has delivered said strand of wire to said holding and cutting unit thereby twisting portions of said strand of wire together and the last revolution of said $(n+\frac{1}{2})$ revolutions being operable to move said rotatable member to the portion of its operating cycle where the wire constituting the bale tie is severed from the strand of wire carried by said wire carrying member.

7. In combination in a baler, means defining an elongated chamber, a piston reciprocably supported in said chamber for compressing crop materials and for moving the compressed materials therethrough, means for reciprocating said piston including a continuously rotating shaft, means for holding and cutting a strand of wire including a rotatable member which is operable to cut a strand of wire held thereby in one portion of its operating cycle, a member movable across said chamber for carrying a strand of wire thereacross and delivering it to said holding and cutting unit, a gate at the side of said chamber positioned to block the path of said wire carrying member at selected periods in the operation of the baler, a rotatable twisting member positioned adjacent said wire holding and cutting means for twisting portions of said strand of wire together to form a bale tie, a wire retaining means disposed on the opposite side of said twisting member from said holding and cutting unit, the path of said wire carrying member passing said wire strand around said retaining means and said twisting member as it travels to said holding and cutting unit, a bale gauge positioned to engage the crop material being moved through said chamber, a timing means including a cam and a mutilated gear having a pair of circumferentially disposed toothed sections which are separated by non-toothed sections, a clutch for interengaging said timing means with said shaft to rotate said gear and said cam one revolution and to then automatically interrupt the rotation said timing means, means operatively connecting said gate and said clutch with said bale gauge to simultaneously effect the withdrawal of said gate from the path of said wire carrying member and to effect the interengagement of said timing means and said shaft in response to the passage of a predetermined amount of crop materials through said chamber, means operably interconnecting said cam with said wire carrying member, a second gear positioned to engage the toothed sections of said mutilated gear, means including a shaft connecting said second gear to said rotatable twisting member and said rotatable member of said holding and cutting means, one of the toothed sections of said mutilated gear being proportioned to rotate said twisting member 180° as said wire carrying member is moved across said chamber by said cam, and the other of the toothed sections of said mutilated gear being proportioned to rotate said twisting member 3½ more revolutions after said wire carrying member has delivered said strand of wire to said holding and cutting unit thereby twisting portions of said strand of wire together, and the last revolution of said 3½ revolutions being operable to move said rotatable element to the portion of its operating cycle where the wire constituting the bale tie is severed from the strand of wire carried by said wire carrying member, and means interconnecting said wire carrying members with said wire retaining means to effect the release of wire held by said retaining means in response to outward swinging of said wire retaining member.

8. In a wire tying mechanism for a baler having a frame which defines an elongated chamber through which compressed crop materials are moved by a baling piston, said frame having openings in opposite sides thereof, said openings being aligned, wire carrying means for passing a strand of baling wire through the opening on one side of said frame, across said chamber, and through the opening on the other side of said frame, a guideway covering said opening in the side of said frame at which the wire is delivered during operation, said guideway being attached to said frame and extending along the line of movement of said compressed crop materials, wire retaining means, means for supporting said wire retaining means on said guideway in a position advanced along the line of movement of the crop materials from the point at which said wire carrying means passes the strand of wire out of said chamber, a wire twisting unit located at the end of said guideway in a position advanced along the line of movement of said compressed material from said retaining means, a wire holding and cutting unit, and means for movably supporting said holding and cutting unit on said frame in a position advanced along the line of movement of said crop materials from said twisting unit, said holding and cutting unit, said twisting unit, and said retaining means being disposed in aligned relation with one another, said supporting means for said holding and cutting unit and said retaining means including resilient means which act to bias said holding and cutting unit and said retaining means away from said twisting unit whereby, during operation, forces tending to shorten the distance between said holding and cutting unit and said retaining means are yieldably resisted.

9. In combination in a baler of the class described, a frame which defines an elongated chamber, a baling piston in said chamber for moving crop materials therethrough, said frame having openings in opposite sides thereof, said openings being aligned, wire carrying means for passing a strand of baling wire in a path which extends through the opening on one side of said frame, across said chamber, through the opening on the other side of said frame, and finally longitudinally along the outside of said chamber in the direction of movement of said crop materials, a guideway covering the opening in the side of said frame at which the wire is delivered during operation, said guideway being attached to said frame and extending along the line of movement of said compressed crop materials, wire retaining means, means for supporting said wire retaining means on said guideway in a position advanced along the line of movement of the crop materials from the point at which said wire carrying means passes the strand of wire out of said chamber, a wire twisting unit located at the end of said guideway in a position advanced along the line of movement of said crop material from said retaining means, a wire holding and cutting unit, and means for movably supporting said holding and cutting unit on said frame in a position advanced along the line of movement of said crop materials from said twisting unit, said holding and cutting unit, said twisting unit, and said retaining means being disposed in aligned relation with one another and being arranged along the path of the wire carried by said carrying means, said supporting means for said holding and cutting unit and said retaining means including resilient means which act to bias said holding and cutting unit and said retaining means away from said twisting unit whereby, during operation, forces tending to shorten the distance between said holding and cutting unit and said retaining means are yieldably resisted.

10. In combination in a baler of the class described, a frame which defines a horizontally disposed, elongated chamber, a baling piston reciprocably supported in said chamber for moving said crop materials therethrough, said frame having openings in opposite sides thereof, said openings being disposed in a common horizontal plane, wire carrying means for passing a strand of baling wire in a path which lies in a horizontal plane which extends through the opening on one side of said frame, across said chamber, through the opening on the other side of said frame, and finally longitudinally along the outside of said chamber in the direction of movement of said crop materials, a guideway covering the opening in the side of said frame at which the wire is delivered during operation, said guideway being attached to said frame and extending longitudinally therealong, wire retaining means, means for supporting said wire retaining means on said guideway in a position advanced along the line of movement of the crop materials from the point at which said wire carrying means passes the strand of wire out of said chamber, a wire twisting unit located in the end of said guideway in a position advanced along the line of movement of said crop material from said retaining means, a wire holding and cutting unit, and means for movably supporting said holding and cutting unit on said frame in a position advanced along the line of movement of said crop materials from said twisting unit, said holding and cutting means, said twisting unit and said retaining means being disposed in aligned relation with one another in a common horizontal plane and being arranged along the path of said wire carried by said carrying means, said mounting means for said holding and cutting unit and said retaining unit including resilient means which act to bias said holding and cutting unit and said retaining means away from said twisting unit.

11. In a wire tying mechanism for a baler having means defining an elongated chamber through the interior of which compressed crop materials are moved by a baling piston, means for feeding baling wire across said chamber comprising a frame which extends across the exterior of said chamber, means hingedly attaching said frame to one side of said chamber-defining-means for swinging movement relative to said chamber, at least one wire carrying needle, said needle being arcuate in shape and providing a guideway for a strand of baling wire, means hingedly supporting said wire carrying needle on said swinging frame at the side of said chamber opposite said connection between said chamber-defining-means and said frame, a lever arm fixedly attached to said hinged needle supporting means, a link pivotally connecting said lever arm to a fixed point on said chamber-defining-means, and means for effecting swinging movement of said frame relative to said chamber whereby said needle is moved longitudinally of said chamber by said swinging frame and is rotated relative to said swinging frame.

12. In a wire tying mechanism for a baler which includes means defining an elongated chamber through the interior of which compressed crop materials are moved by a baling piston, means for feeding baling wire across said chamber comprising a box-like frame which is disposed about the exterior of said chamber, means including a vertically extending pivot for hingedly attaching said frame to one side of said chamber-defining-means for swinging movement relative thereto, at least one wire carrying needle, said needle being arcuate in shape and providing a guideway for a strand of baling wire, a vertically extending member rotatably supported at the end of the swinging frame opposite said vertically extending pivot, means for attaching one end of said wire carrying needle to said vertically extending member, a lever arm attached to said vertically extending member, a link pivotally connecting said lever arm to a fixed point on said chamber-defining-means, each of the connections between said link and said chamber-defining-means and said link and said lever arm permitting hinged movement in a horizontal plane, and means for effecting swinging movement of said frame relative to said chamber whereby said needle is moved longitudinally of said chamber by said swinging frame and is rotated relative to said swinging frame thereby moving said needle across the interior of said chamber.

13. In a wire tying mechanism for a baler having means defining an elongated chamber through which compressed crop materials are moved by a baling piston and having openings in the sides of said chamber-defining-means for admitting a strand of baling wire into the interior of said chamber, means for passing a strand of baling wire across said chamber comprising a frame which extends across said chamber-defining-means, means hingedly attaching said frame to said chamber-defining-means for swinging movement relative thereto, at least one wire carrying needle, means for hingedly supporting said wire carrying needle on said frame, means connecting said hinged needle supporting means to said chamber-defining-means, means for covering the openings into said baling chamber to prevent the entrance of said needle into said chamber, and means for effecting the uncovering of said openings and the swinging movement of said frame relative to said chamber whereby said needle is moved through said opening and across said chamber.

14. In a wire tying mechanism for a baler having means defining an elongated chamber through which compressed crop materials are moved by a baling piston and having openings in the sides of said chamber-defining-means for admitting a strand of baling wire into the interior of said chamber, means for passing a strand of baling wire across said chamber comprising, a frame which extends across said chamber-defining-means, means hingedly attaching said frame to said chamber-defining-means for swinging movement relative thereto, at least one wire carrying needle, means for hingedly supporting said wire carrying needle on said swinging frame, means connecting said needle supporting means to said chamber-defining-means, means for covering the openings into said baling chamber to prevent the entrance of said needle into said chamber, means for effecting the uncovering of said openings and the swinging movement of said frame relative to said chamber whereby said needle is moved through said opening across said chamber, and a guideway on the exterior of said chamber-defining-means for supporting at least the end portion of said wire carrying needle.

15. In a wire tying mechanism for a baler having means defining an elongated chamber through which compressed crop materials are moved by a baling piston and having openings in the sides of said chamber-defining-means for admitting a strand of baling wire into the interior of said chamber, means for passing a strand of baling wire across said chamber comprising a frame which extends across said chamber-defining-means, hingedly attaching said frame to said chamber-defining-means for swinging movement relative thereto, at least one wire carrying needle, means for hingedly supporting said wire carrying needle on said frame, means connecting said hinged needle supporting means to said chamber-defining-means, means for covering the openings into said baling chamber to prevent the entrance of said needle into said chamber, comprising a gate which is interposed in the path of said needle, said gate being hingedly supported on said chamber-defining-means, and means for withdrawing said gate from the path of said needle and for effecting a swinging movement of said frame relative to said chamber whereby said needle is moved past said gate and across said chamber.

16. In a wire tying mechanism for a baler having means defining an elongated chamber through which crop materials are moved by a baling piston and having openings in the sides of said chamber-defining-means for admitting a strand of baling wire into the interior of said chamber, means for passing a strand of baling wire across said chamber comprising a frame which extends across said chamber-defining-means, means including a vertically extending pivot for hingedly attaching said frame to said chamber-defining-means for swinging movement relative thereto, at least one wire carrying needle, said needle being arcuate in shape and being disposed in a horizontal plane, means including a vertically extending pivot for hingedly supporting said wire carrying needle on said frame, and means connecting said hinged needle supporting means to said chamber-defining-means, means for covering the openings into said chamber to prevent the entrance of said needles into said chamber comprising a lobe-like gate which is interposed in the path of said needle, said gate being pivotally supported on said chamber-defining-means by a horizontally extending pivot, and means for moving said gate about said pivot for uncovering said openings and for effecting the swinging movement of said frame relative to said chamber whereby said needle is moved through said opening and across said chamber.

17. In a wire tying mechanism for a baler having means defining an elongated chamber through which crop materials are moved by a baling piston and having openings in the sides of said chamber-defining-means for admitting a strand of baling wire into the interior of said chamber, means for passing a strand of baling wire across said tending pivot for hingedly attaching said frame to said chamber-defining-means, means including a vertically ex-tending pivot for hingedly attaching said frame to said chamber-defining-means for swinging movement relative thereto, at least one wire carrying needle, said needle being arcuate in shape and being disposed in a horizontal plane, means including a vertically extending pivot for hingedly supporting said wire carrying needle on said frame, and means connecting said hinged needle supporting means to said chamber-defining-means, a guideway for said needle, said guideway comprising a pair of horizontally disposed, vertically spaced-apart plate members which are attached to said chamber-defining-means in registering relation with one of the openings therein, means for covering the opening in said chamber to prevent the entrance of said needle into said chamber comprising a gate which is interposed in the path of said needle, said gate being pivotally supported on said chamber-defining-means by a horizontally extending pivot and being movable into the space between said spaced-apart plates, and means for moving said gate about said pivot for withdrawing said gate from the path of said needle and for effecting a swinging movement of said frame relative to said chamber whereby said needle is moved through said opening and across said chamber.

18. In a wire retaining mechanism for a wire tying unit in a baler, a supporting member having an elongated opening therein disposed generally parallel to the strands of wire to be held by said mechanism, a support bracket, means for hingedly attaching said support bracket to said member, a retaining pin which extends through the opening of said member, said pin being parallel to the axis of the hinged connection between said bracket and said member, a serrated member on said support bracket which is concentric with said pin, a second serrated member engaged against said first serrated member, said second serrated member being attached to said pin, means resiliently biasing said serrated members together, means for rotating said serrated member associated with said pin in response to predetermined movements of other portions of said tying unit, and resilient means intermediate said support bracket and said supporting member for biasing said support bracket to yieldably resist movement of said bracket about its pivotal axis in the direction of said wire leads being tied.

19. In a wire retaining mechanism for a wire tying unit in a baler having a wire guideway including an elongated opening through which strands of wire are passed during operation, said opening being disposed generally parallel to the strands of wire to be held by said mechanism, a support bracket, means for hingedly attaching said support bracket to said guideway, a retaining pin which extends through the opening of said guideway, said pin being parallel to the axis of the hinged connection between said guideway and said support bracket, a serrated member on said support bracket which is concentric with said pin, a second serrated member engaged against said first serrated member, said second serrated member being attached to said pin, spring means intermediate said pin and said first serrated member for biasing said serrated members together, means for rotating said serrated member associated with said pin in response to a predetermined movement of other portions of said tying unit, and spring means intermediate said supporting bracket and said guideway for biasing said support bracket to yieldingly resist movement of said bracket about its pivotal axis in the direction of said wire strands being tied.

20. In a wire tying mechanism for a baler having an elongated chamber which is defined by means including side members and a needle in an initial position on one side of said chamber and being swingably supported for movement across said chamber to pass a strand of wire across said chamber, a guideway on the side of said chamber which is opposite said needle for receiving said needle after it has passed across said chamber, a retainer mechanism on said guideway which includes a pin which is movable to extend through said guideway to engage the wire carried by said needle, and means connecting said pin with said needle so that said pin is moved out of said guideway momentarily in response to the outward swinging movement of said needle as said needle moves towards its initial position.

21. In a wire tying mechanism for a baler having an elongated chamber which is defined by side members and a needle in an initial position on one side of said chamber and being swingably supported for movement to carry a strand of wire across said chamber, a guideway on the opposite side of said chamber, said guideway comprising a pair of spaced apart, parallel members which are adapted to receive said needle after it has passed across said chamber, a retaining mechanism including a pin which extends between said plates, said pin being positioned inside of the swinging path of said needle to engage the wire carried by said needle, and means connecting said retaining mechanism with said needle so that said retaining mechanism is actuated by the outward swinging movement of said needle as said needle is returned to the initial position to move said pin momentarily from said guideway to release the wire held by said pin.

22. In a wire tying mechanism for a baler having an elongated chamber which is defined by side members and a needle in an initial position on one side of said chamber, said needle being swingably supported to carry a strand of wire across said chamber, a guideway on the opposite side of said chamber, said guideway comprising a pair of spaced-apart, parallel members which are adapted to receive said needle after it has passed across said chamber, and a wire retaining mechanism including a pin which extends between said plates, said pin being positioned inside the swinging path of said needle to engage the wire carried by said needle, said retaining mechanism including a pair of interengaged serrated members which are concentric with said pin and which are supported for rotative movement relative to one another, one of said serrated members being operably attached to said pin and the other of said serrated members being supported upon said guideway, outward swinging movement of said needle being operable to rotate said serrated members relative to one another whereby said members move longitudinally relative to one another to momentarily retract said pin from said guideway to release wire held by said pin.

23. In a wire tying mechanism for a baler having an elongated chamber which is defined by side members and a needle in an initial position on one side of said chamber, said needle being swingably supported about a vertically extending pivot on the other side of said chamber to carry a strand of wire across said chamber, a guideway on the opposite side of said chamber, said guideway comprising a pair of spaced-apart, parallel members which are adapted to receive said needle after it has passed across said chamber, and a wire retaining mechanism including a pin which extends between said plates, said pin being positioned inside the swinging path of said needle to engage the wire carried by said needle, said retaining mechanism including a pair of resiliently interengaged serrated members which are concentric with said pin and which are supported for rotative movement relative to one another, one of said serrated members being attached to said pin and the other of said serrated members being supported upon said guideway, and a ratchet interconnecting said vertically extending pivot with said serrated members attached to said pin, outward swinging movement of said needle with the consequent rotation of said vertically extending pivot being operable to rotate said serrated members relative to one another whereby said pin is momentarily retracted from said guideway to release wire held by said pin.

24. In a baler of the class described which comprises a bale casing, continuously reciprocating means for compressing and moving crop material through said casing, and means for tying the compressed material, a timing mechanism operatively connected to the tying means, and a clutch for selectively engaging said timing mechanism to the continuously reciprocating means, the improvement comprising a bale gauge adapted to actuate said clutch in response to the movement of a pre-determined amount of crop material through the casing, said bale gauge including a frame, a stud supported upon said frame, a gauge wheel rotatably mounted on said stud and positioned to engage the crop material passing through the casing, said wheel having an elongated slot formed therein, an arm pivotally attached to said stud on one side of said wheel, a shank fixedly attached to said arm and extending through said slot, and resilient means extending between said arm and said wheel for biasing said shank against the leading edge of said slot with respect to the direction of rotation of said wheel, and a mechanical linkage which is connected to said clutch and which is positioned to be engaged and actuated by said shank when said wheel is rotated.

25. In a baler of the class described which comprises a bale casing, continuously reciprocating means for compressing and moving crop material through said casing, and means for tying the compressed material, a timing mechanism operatively connected to the tying means, and a clutch for selectively engaging said timing mechanism to the continuously reciprocating means, the improvement comprising a bale gauge operable to actuate said clutch in response to the movement of a pre-determined amount of crop material through said casing, said bale gauge including a frame structure attached to the bale casing, a stud supported upon said frame structure, a gauge wheel rotatably mounted upon said stud and positioned to engage the crop material in the casing, said gauge wheel including a spider having a plurality of radially extending arms, and a plurality of segments adjustably attached to said arms for radial movement, said segments having a serrated periphery for engaging the crop material, one of said segments having a slot formed therein, an arm pivotally attached to said stud outwardly of said wheel with respect to said frame structure, a shank fixedly attached to said arm and extending through said slot, resilient means extending between said arm and said wheel for biasing said shank against the leading edge of said slot with respect to the rotation of said wheel, and a mechanical linkage connecetd to said clutch and supported upon said frame structure, said linkage including a lever arm which is engaged and actuated by said shank, said lever being biased to overcome the tension of said resilient means associated with said lever arm so that said lever arm is actuated when said shank engages the trailing edge of said slot.

26. In a wire tying mechanism for a baler having means defining a chamber through which compressed crop materials are moved and means for passing a strand of wire from one side of the chamber to the other, a wire twisting mechanism comprising a housing which includes a pair of spaced apart members having registering openings therein which communicate with said chamber and which are adapted to receive said wire after it has been passed across said chamber, a twisting gear, means for supporting said twisting gear in said housing including a pair of annular bearings one of which is rotatably supported in each of the registering openings, means for attaching said twisting gear to at least one of said bearings, said twisting gear having means defining a radially extending opening in the central portion thereof which extends to the periphery of the gear, a radially extending finger disposed in said gear opening and defining therewith a pair of slots for receiving the wire, said finger slanting away from the plane of the gear, and means for rotating said twisting gear.

27. In a wire tying mechanism for a baler having means defining a chamber through which compressed crop materials are moved and means for passing a strand of wire from one side of the chamber to the other, a wire twisting mechanism comprising a housing which includes a pair of spaced apart members having openings therein communicating on one side with said chamber and being adapted to receive, at the other side, said wire after it has been passed across said chamber, a twisting gear having teeth around the periphery thereof and means defining a radially extending opening in the central portion thereof which extends to the periphery of the gear, a radially extending finger disposed in said gear opening and defining therewith a pair of slots for receiving the wire, said finger shanting away from the plane of the gear in the direction of movement of the compressed material in said chamber, means for supporting said twisting gear in said housing, and means for rotating said twisting gear.

28. In a wire typing mechanism for a baler having means defining an elongated chamber through which compressed crop materials are moved and means for passing a strand of wire from one side of the chamber to the other, a wire twisting mechanism comprising a housing which includes a pair of parallel, spaced apart members, said members being disposed in planes which are generally at right angles to the longitudinal axis of said chamber and including means defining concentric, registering openings which communicate at one side with said chamber and are adapted to receive, at the other side, said wire after it has been passed across said chamber, a twisting gear having teeth around the periphery thereof and a radially extending opening in the central portion thereof which extends to the periphery of the gear, said radially extending opening being generally V-shaped having its greatest width at the periphery of said gear, a radially extending member being provided to bisect said opening thereby providing a pair of radially extending slots, said radially extending finger slanting away from the plane of said gear in the direction of movement of the crop material through said chamber, and means for supporting said twisting gear intermediate said parallel, spaced-apart housing members including a pair of annular collars one of which is rotatably supported in each of said openings in said spaced apart members, means for attaching said twisting gear to said collars, each of said collars including a ring portion which extends radially outwardly along the side of said twisting gear to cover the sides of said gear teeth, and driving means for said twisting gear which comprises a gear meshing with the teeth on said twisting gear.

29. In a wire tying mechanism for a baler having a frame which defines an elongated chamber through which compressed crop materials are moved, said frame having openings in opposite walls thereof, said openings being aligned, wire carrying means for passing a strand of baling wire through the opening in one wall of said frame, across said chamber, and through the opening in the other wall of said frame, wire retaining means, means supporting said wire retaining means adjacent the opening in the wall to which said wire is delivered during operation, said retaining means being in a position advanced along the line of movement of the compressed crop materials from the point at which the wire carrying means passes the strand of wire out of said chamber, a wire twisting unit, means supporting said wire twisting unit on said frame in aligned relation with the retaining means and in a position advanced along the line of movement of the compressed material from said retaining means, a wire holding and cutting unit, and means supporting said holding and cutting unit in aligned relation with said retaining means and said twisting unit and in a position advanced along the line of movement of said compressed material from said twisting unit, said support means for said holding and cutting unit including resilient means which acts to bias said holding and cutting unit away from said twisting unit whereby movement of the portion of the wire held by said holding and cutting unit toward said twisting unit is afforded during the operation of the twisting unit.

30. In a strand tying mechanism for a baler having means defining an elongated chamber through the interior of which compressed crop materials are moved by a baling piston, means for feeding a tying strand across said chamber comprising a frame which extends across the exterior of said chamber, means hingedly attaching said frame to one side of said chamber defining means for swinging movement relative to said chamber, a strand carrying needle, means hingedly supporting said needle on said swinging frame at the side of said chamber opposite said connection between said chamber defining means and said frame, a lever arm fixed to said hinged needle, means connecting said lever arm to a fixed point on said baler, and means for effecting swinging movement of said frame relative to said chamber whereby said needle is moved longitudinally of said chamber by said swinging frame and is rotated relative to said swinging frame.

31. In a wire tying mechanism for a baler having a frame which defines an elongated chamber through which compressed crop materials are moved by a baling piston, said frame having openings in opposite sides thereof, said openings being aligned, wire carrying means for passing a strand of baling wire through the opening of one side of said frame, across said chamber, through the opening on the other side of said frame and along the latter in the direction of movement of the compressed material, a guideway covering said opening in the side of said frame at which the wire is delivered during operation, said guideway being attached to said frame and extending along the line of movement of said compressed crop materials, wire retaining means on said guideway in a position along the side of said chamber advanced from the rearward end of the compressed crop materials across which said wire carrying means passes in its movement through said chamber, a wire twisting unit located at the end of said guideway in a position advanced along the line of movement of said crop materials from said retaining means, a wire holding and cutting unit, and means for movably supporting said holding and cutting unit on said frame in a position advanced along the line of movement of said crop materials from said twisting unit, said holding and cutting unit, twisting unit, and said retaining means being disposed in aligned relation with one another, said supporting means for said holding and cutting unit and said retaining means including resilient means which act to bias said holding and cutting unit and said retaining means away from said twisting unit whereby, during operation, forces tending to shorten the distance between said holding and cutting unit and said retaining means are yieldably resisted.

References Cited in the file of this patent

UNITED STATES PATENTS

| Number | Name | Date |
|---|---|---|
| 646,819 | Foster | Apr. 3, 1900 |
| 1,305,344 | Dudley | June 3, 1919 |
| 1,579,777 | Pearson et al. | Apr. 6, 1926 |
| 1,590,319 | Robins | June 29, 1926 |
| 1,624,157 | Carrol | Apr. 12, 1927 |
| 1,673,125 | Robbins | June 12, 1928 |
| 1,889,372 | Nolan | Nov. 29, 1932 |
| 1,932,917 | Taylor | Oct. 31, 1933 |
| 2,030,031 | Innes | Feb. 4, 1936 |
| 2,292,779 | Barker | Aug. 11, 1942 |
| 2,405,688 | Crumb | Aug. 13, 1946 |
| 2,456,476 | West et al. | Dec. 14, 1948 |
| 2,469,578 | Ronning et al. | May 10, 1948 |
| 2,512,754 | Tuft | June 27, 1950 |
| 2,528,538 | Nolt | Nov. 7, 1950 |
| 2,548,559 | Ronning et al. | Apr. 10, 1951 |
| 2,610,573 | Altgelt | Sept. 16, 1952 |